(12) United States Patent
Guim Bernat et al.

(10) Patent No.: US 12,445,524 B2
(45) Date of Patent: Oct. 14, 2025

(54) METHODS AND APPARATUS TO SHARE MEMORY ACROSS DISTRIBUTED COHERENT EDGE COMPUTING SYSTEM

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 760 days.

(21) Appl. No.: 17/485,040

(22) Filed: Sep. 24, 2021

(65) Prior Publication Data

US 2022/0014588 A1     Jan. 13, 2022

(51) Int. Cl.
| | |
|---|---|
| *H04L 67/1097* | (2022.01) |
| *G06F 12/0817* | (2016.01) |
| *G06F 13/16* | (2006.01) |
| *G06F 13/36* | (2006.01) |

(52) U.S. Cl.
CPC ...... *H04L 67/1097* (2013.01); *G06F 12/0828* (2013.01); *G06F 13/1668* (2013.01); *G06F 13/36* (2013.01); *G06F 2212/621* (2013.01); *G06F 2213/40* (2013.01)

(58) Field of Classification Search
CPC ............. H04L 67/1097; G06F 12/0828; G06F 13/1668; G06F 13/36; G06F 2212/621; G06F 2213/40
See application file for complete search history.

(56) References Cited

U.S. PATENT DOCUMENTS

| | | | |
|---|---|---|---|
| 11,438,747 B1* | 9/2022 | Subramaniam | ......... H04W 4/70 |
| 2014/0040561 A1* | 2/2014 | Lih | ...................... G06F 12/0831 |
| | | | 711/146 |
| 2021/0011864 A1 | 1/2021 | Guim Bernat et al. | |

(Continued)

OTHER PUBLICATIONS

European Patent Office, "Extended European Search Report," issued in connection with European Patent Application No. 22189247.4, Feb. 21, 2023, 10 pages.

(Continued)

*Primary Examiner* — Viet D Vu
(74) *Attorney, Agent, or Firm* — Hanley, Flight & Zimmerman, LLC

(57) ABSTRACT

Methods, apparatus, systems, and articles of manufacture are disclosed that reduce latency and bandwidth consumption when sharing memory across a distributed coherent Edge computing system. The distributed coherent Edge computing system disclosed herein configures a compute express link (CXL) endpoint to share data between memories across an Edge platform. The CXL endpoint configures coherent memory domain(s) of memory addresses, which are initialized from an Edge device connected to the Edge platform. The CXL endpoint also configures coherency rule(s) for the coherent memory domain(s). The CXL endpoint is implemented to snoop the Edge platform in response to read and write requests from the Edge device. The CXL endpoint selectively snoops memory addresses within the coherent memory domain(s) that are defined as coherent based on the coherency rule(s).

28 Claims, 13 Drawing Sheets

(56) References Cited

U.S. PATENT DOCUMENTS

2021/0149803 A1    5/2021  Bernat
2021/0373951 A1*  12/2021  Malladi ................. G06F 9/5016
2023/0017643 A1*   1/2023  Shah ................... G06F 13/4022

OTHER PUBLICATIONS

CXL Consortium, "Introduction to Compute Express Link™ (CXL™) Technology," YouTube.com, retrieved from https://www.youtube.com/watch?v=HPpQLGIxZWM, 1 page.
Udacity, "Cache Coherence Problem—Georgia Tech—HPCA: Part 5," YouTube.com, retrieved from https://www.youtube.com/watch?v=TMJj015C93A, 1 page.
Patrick Kennedy, "Compute Express Link or CXL What it is and Examples," ServeTheHome, May 21, 2021, 6 pages.
"Compute Express Link," Wikipedia, last edited Dec. 15, 2022, 6 pages.
"Cache coherence," Wikipedia, last edited Mar. 20, 2022, 6 pages.
European Patent Office, "Communication pursuant to Article 94(3) EPC," issued in connection with European patent application No. 22 189 247.4, mailed on Mar. 13, 2025, 5 pages.
European Patent Office, "Communication under Rule 71(3) EPC," issued in connection with European Patent Application No. 22 189 247.4, dated Jul. 11, 2025, 8 pages.

\* cited by examiner

METHODS AND APPARATUS TO SHARE MEMORY ACROSS DISTRIBUTED COHERENT EDGE COMPUTING SYSTEM

FIELD OF THE DISCLOSURE

This disclosure relates generally to Edge computing and, more particularly, to methods and apparatus to share memory across distributed coherent Edge computing systems.

BACKGROUND

In recent years, Edge computing has provided improved cloud computing services by moving computation and data storage closer to the sources of data. Instead of a personal device or an Internet of Things (IoT) device transmitting data and offloading computations to a cloud data center, an Edge network uses base stations (e.g., Edge compute nodes) deployed closer to endpoint devices that can offer the same functionality of the cloud data center but on a smaller scale. By providing Edge nodes closer to the edge devices, the edge service offers much lower latency than if the device were to communicate with the cloud data center. In other words, the time it takes to begin a data transfer or computation at the Edge node is much shorter than it would take to perform the same operations at the cloud data center. Therefore, services that rely on cloud storage or computation and also require low latency to accomplish tasks must employ edge computing to function properly.

Figure 1:
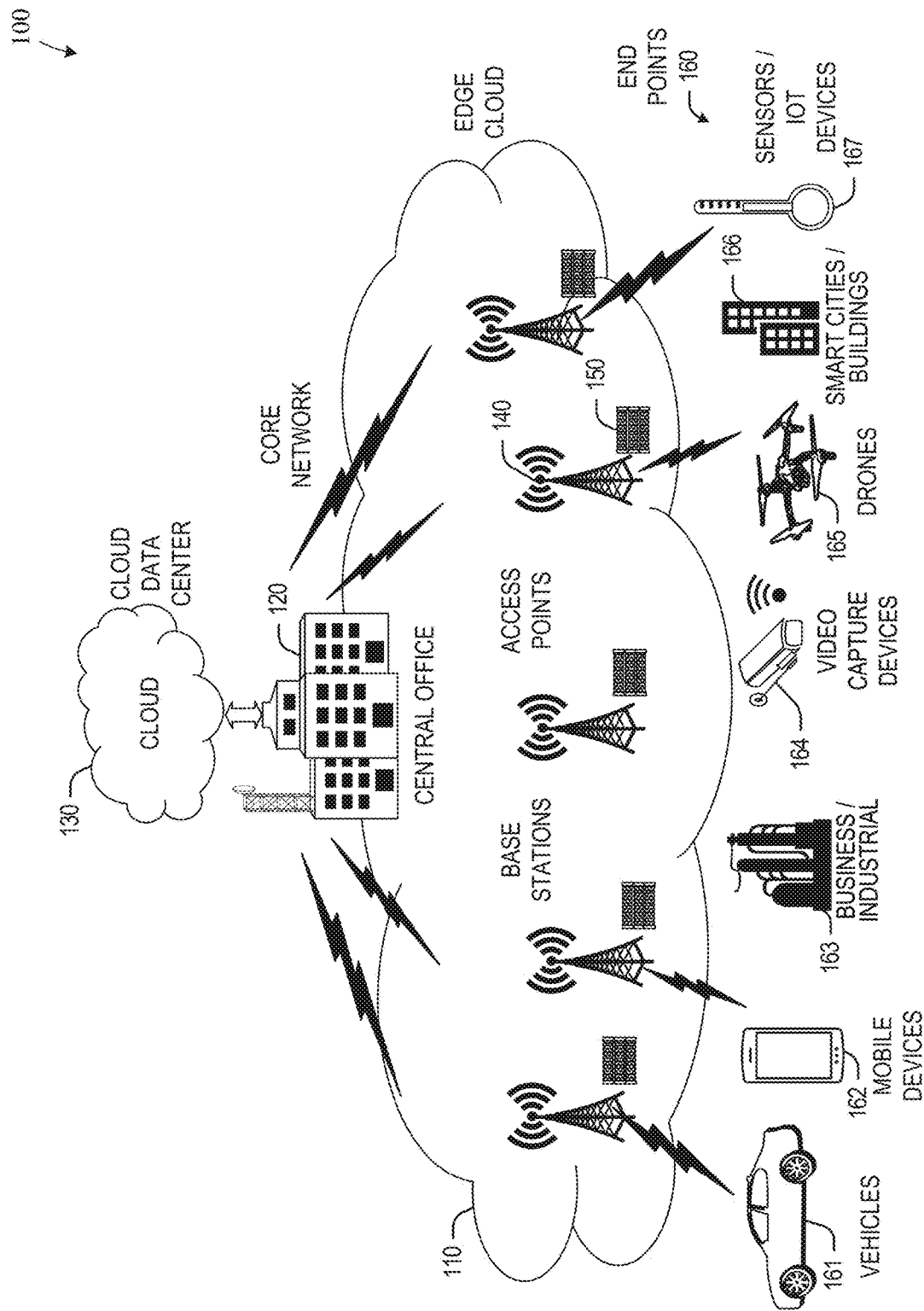
FIG. 1 illustrates an overview of an Edge cloud configuration for Edge computing.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

For Edge computing networks to operate effectively, base stations communicate relevant data to other Edge nodes within a topological proximity based on the connection ranges of the base stations. An Edge device might require data pertaining to another Edge device, in which case, the Edge compute nodes with which the Edge devices are communicating will need to share the data at relevant memory addresses between the cached memories in both Edge nodes. In some examples, a memory address is a fixed-length sequence of non-negative integers used to reference the memory location of a datapoint in various levels of hardware or software memory. For example, if an autonomous vehicle was driving down the highway while transmitting positional data to an Edge compute node, the positional data of the autonomous vehicle will most likely need to be shared with at least one other autonomous vehicle on the road. Moreover, since the Edge device may need to continuously write or read these data to and/or from the Edge compute node, the number of transactions between base stations would also need to be continuous. To share data in this way, the Edge compute nodes will typically have to use a two-phase commit protocol, which is a type of atomic commit protocol. This is an algorithm that can be implemented in a distributed network to manage the process of committing or aborting transactions between two entities in a shared network. In order to use a two-phase protocol, the two base stations must engage in multiple handshakes. The handshake of this example is a process to automatically exchange information that establishes the protocols to be used in the communication link before a data exchange can begin.

An example distributed Edge computing network can implement cache coherence to perform data transactions between Edge compute nodes without having to use two-phase commit protocols or another type of atomic commitment protocol. Since, some commit protocols may include as many as eight handshakes between base stations, the latency can be extremely high. Sometimes this latency rivals the amount of time it would take for the Edge device to simply have communicated directly with a cloud server.

In examples disclosed herein, the term cache coherence refers to a system state in which one type of data occurs simultaneously in different cache memory. A cache can be hardware or software component that stores data for future requests that can be called faster than if that same data were to be called from main memory or hard drive. Data that is stored in cache memory may eventually be stored to the main memory as well.

An interconnect standard known as Compute Express Link (CXL) can be implemented to establish cache coherency between multiple servers at multiple Edge compute nodes across a distributed Edge network. Compute Express Link was created in by a consortium of companies that collaborated to design next-generation data center performance. CXL uses three protocols to accelerate the performance of a computing system: input/output (CXL.io), memory (CXL.mem), and cache coherence (CXL.cache). An example hardware with CXL capability can operate on the peripheral component interconnect express (PCIe) port to perform high-speed writes and reads to and from central processing unit (CPU) to device and CPU to memory.

In the examples disclosed herein, a CXL.io protocol can be used by an example CXL device to perform initializations, link-ups, device discoveries and enumerations, and register accesses. An example CXL device using the CXL.io protocol can initialize data by assigning initial values to data objects or variables and storing them in a memory block within the main memory. The example initial data values can be received from an example Edge device establishing a communication connection with the example Edge compute node. The example CXL device could then perform network enumeration to discover other hosts or devices, group information, and Edge services within a shared Edge network. In some examples, the CXL device could also perform a link-up between two or more devices for the purpose of data transmission. In some examples, this can be a physical link or virtual circuit between two example Edge compute nodes. The example CXL device could also use the CXL.io protocol to access registers within the processors of the host device and the attached device. The example processors of the host device and the attached device can be the processors of the Edge compute nodes within the Edge network or the processors of the example CXL devices attached to the Edge compute nodes. The registers accessed using CXL.io could, for example, include general-purpose registers, which are hardware architecture that can store both data and memory addresses within easily accessible memory.

In the examples disclosed herein, the CXL device establishes connections with the example Edge device, other Edge compute nodes within the Edge network, and the central processing unit (CPU) of the Edge compute node to which it is attached. In the examples disclosed herein, a CXL device can refer to hardware (e.g., network interface controller (NIC)) configured to operate as a CXL endpoint. In some examples, the CXL device can use the CXL.cache and/or CXL.mem protocol(s) to configure full or selective cache coherence between the other CXL devices within the Edge network. The CXL.cache and/or CXL.mem protocol(s) can be used to define the interactions between the example CXL device acting as an example home device and a multitude of example CXL devices in other Edge compute nodes acting as auxiliary devices. In some examples, the CXL.cache protocol allows the auxiliary CXL devices to efficiently cache the host device's memory with extremely low latency. To accomplish this, CXL.cache uses a request and response approach, which is a method of communication between two devices connected to a shared network. Essentially, one example CXL device could send a request for a datapoint to the other example CXL devices in the Edge network. One example CXL device receiving the request could respond with a hit (i.e., the cached data is valid) and send the data back to the first CXL device. In this same example, the other example CXL devices receiving the request could respond with a miss (i.e., the cached data is invalid or there is no data at that address) and send a miss response to the first CXL device.

In some examples, the CXL device can use the CXL.mem protocol in addition to CXL.io and CXL.cache to provide the host CPU with access to device-attached memory(ies) and other cache memory(ies) in the Edge network. In other words, the example host CXL device could use a load-store architecture to load and store data between memory and registers within a single CPU or to load and store data between registers of different device's CPUs. In other examples, the CXL device can use the CXL.mem protocol in addition to the CXL.io protocol to access device-attached memory(ies) and other cache memory(ies) in an incoherent Edge network.

In some examples, the CXL device can efficiently request data using a snooping technique. Snooping is a scheme within a cache coherent system where an example coherency controller monitors the bus of a system for modifications to data stored in multiple caches across the system. In the examples disclosed herein, the bus being snooped can be an example CXL interconnect, or a network connection established by the CXL device to communicate data between other example CXL devices attached to Edge compute nodes within an Edge computing network. When an example processor changes data stored in cached memory in a coherent system, other example devices attached to the same bus may have the same data stored within their own example cached memories. The example attached devices can continuously monitor or snoop the CXL interconnect to flag changes made to data at a memory address. In such examples, if data modification is detected via snooping, the CXL device will respond in one or more ways. For example, the CXL device updates the new data value(s) stored at the associated memory address(es) in the cached memories across the Edge platform (write-update) or invalidates the data stored at the associated memory address(es) in the cached memories across the Edge platform (write-invalidate). For examples in which data is invalidated at a particular memory address, the device will return a miss to requests made for that data by another device. The requesting device will have to snoop the rest of the devices in the system for a hit to return the valid data.

In the examples disclosed herein, a CXL device can be implemented in multiple example Edge compute nodes to establish an interconnected Edge platform and create a distributed coherent Edge computing system. Example CXL devices attached to the Edge compute nodes can configure an example home Edge compute node to store memory addresses of the connected Edge device in its main memory, one or more example coherent memory domains to specify the memory addresses that require coherence, and one or more example coherency rules to specify the coherency parameters of the coherent memory domain(s). By implementing CXL devices to enable cache coherence across a distributed Edge network, latency can be significantly reduced relative to the Edge network using commit protocols. By implementing specified coherent memory domain(s) and coherency rule(s), the CXL devices can selectively snoop the distributed coherent Edge network when reading or writing data that satisfies the two coherency categories. This selective snooping can significantly reduce bandwidth consumption relative to having the CXL devices continuously snooping the CXL interconnect for and read or write requests or modifications. In some examples, the CXL device can use write-update protocols or write-invalidate protocols depending on the coherency rule(s) configured for the coherent memory domain(s). In the examples disclosed herein, the coherent memory domain(s) and/or the coherency rule(s) can be configured using instructions, functions, and/or procedures (e.g., software, application programming interface (API), etc.) distributed to the CXL device(s) over an example network.

In the examples disclosed herein, coherency rule(s) can refer to protocol(s), model(s), and/or rule(s) that can be configured to define the parameter(s) and/or method(s) by which data is shared across memories in the Edge platform. In some examples, the coherency rule(s) can be one or more cache-coherency protocols and/or directory implementations (e.g., MESI, MOESI, etc.) to maintain data coherency between caches. In other examples, the coherency rule(s) can be one or more consistency models (e.g., strict consistency, sequential consistency, causal consistency, processor consistency, etc.) which can define the order of operations (e.g., updates, invalidates, etc.) and the visibility of those operations with other caches in the Edge platform. In some examples, the coherency rule(s) can be configured to define cache coherency in terms of subset(s) of memory addresses (e.g., coherent memory domain(s)). For example, instead of data being updated or invalidated across the coherent system, that data gets updated or invalidated if the data is within the coherent memory domain(s). In some examples, the coherency rule(s) can be configured to define cache coherency in terms of time period(s). For example, instead of data being updated or invalidated at memory address(es) continuously, that data gets updated or invalidated once per time interval (e.g., five minutes) across the coherent system. In some examples, coherency rule(s) can be can be configured to define cache coherency in terms of a combination of coherent memory domain(s) and time period(s).

In examples disclosed herein, coherent memory domain(s) and/or coherency rule(s) can be configured by the CXL device. The terms "configure," "configures," "configuration," or other forms of "configure" refer to selecting and/or updating features of the coherent memory domain(s) and/or coherency rule(s) based on instructions executed by processor circuitry and/or other circuitry on the CXL device and stored in non-volatile memory on the Edge node and/or the CXL device. In some examples, the instructions can be software, APIs, and/or other package(s) that operate the CXL device. In some examples, the instructions are executed by the CXL device to configure the coherent memory domain(s) by selecting and/or updating the memory address(es) that are to be coherent across the system. In some examples, the memory address(es) can be initialized from an Edge device and stored in the main memory(ies) of the home Edge node and/or the CXL device. In some examples, the CXL device executes the instructions to configure the coherent memory domain(s) based on the list of Edge node(s) in the Edge platform, the list of Edge service identification(s) (e.g., global process address identification(s)) in the Edge platform, and/or the classification of memory address(es) initialized from the Edge device. In some examples, the instructions are executed by the CXL device to configure the coherency rule(s) by selecting and/or updating the type of coherency (e.g., full coherency, non-coherency, time-dependent coherency, etc.) for the given coherent memory domain(s). In some examples, the CXL device configures the coherency rule(s) based on the parameters of the coherent memory domain(s) (e.g., the list of Edge node(s), the list of Edge service identification(s), the classification of memory address(es), etc.). In some examples, the CXL device configures the coherent memory domain(s) and/or the coherency rule(s) in response to an Edge device connecting to the CXL device and/or the Edge node on which the CXL device is attached.

FIG. 1 is a block diagram 100 showing an overview of a configuration for Edge computing, which includes a layer of processing referred to in many of the following examples as an "Edge cloud". As shown, the Edge cloud 110 is co-located at an Edge location, such as an access point or base station 140, a local processing hub 150, or a central office 120, and thus may include multiple entities, devices, and equipment instances. The Edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the Edges in the Edge cloud 110 are critical to providing ultra-low latency response times for services and functions used by the endpoint data sources 160 as well as reduce network backhaul traffic from the Edge cloud 110 toward cloud data center 130 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because Edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
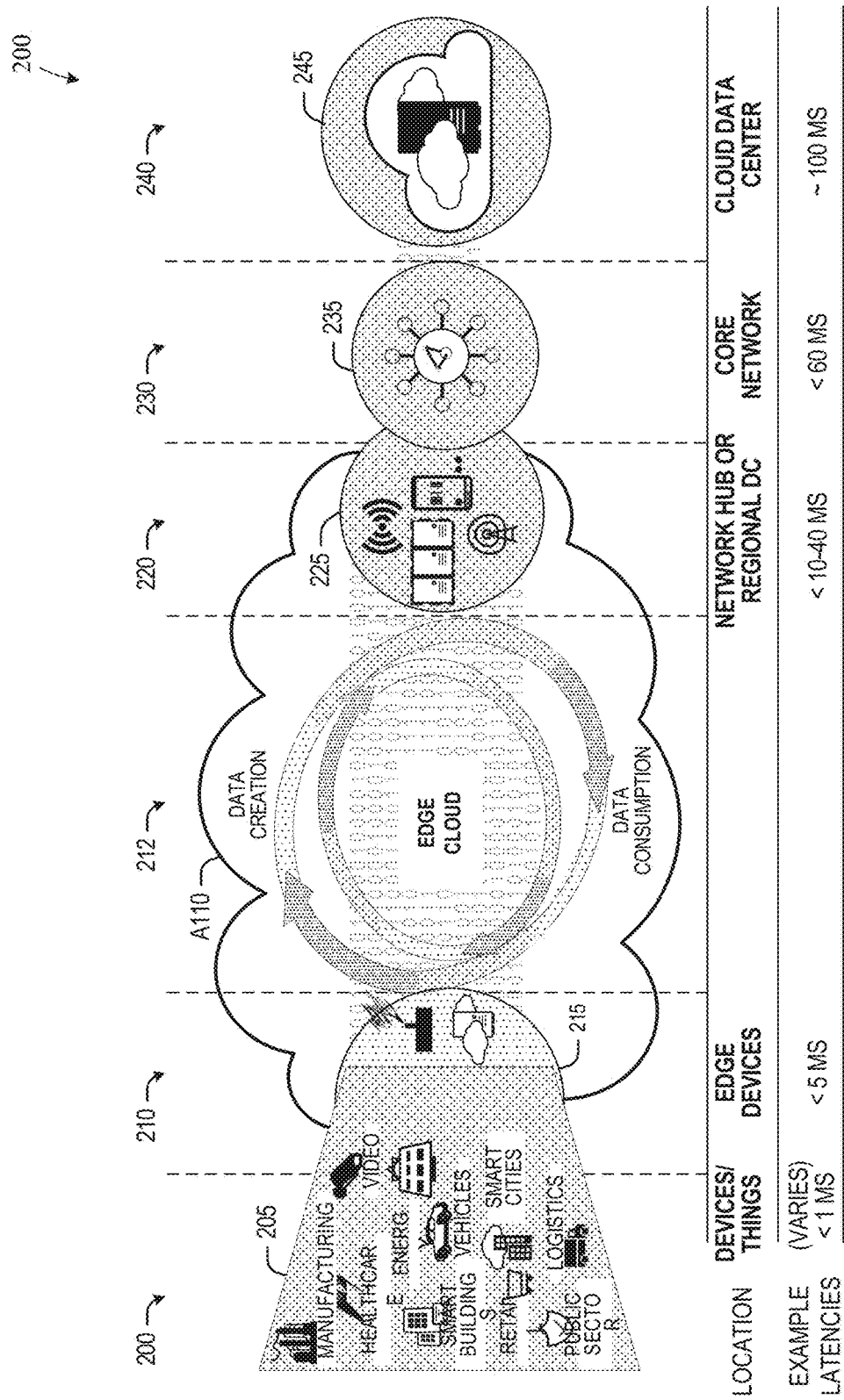
FIG. 2 illustrates operational layers among endpoints, an Edge cloud, and cloud computing environments.

FIG. 2 illustrates operational layers among endpoints, an Edge cloud, and cloud computing environments. Specifically, FIG. 2 depicts examples of computational use cases 205, utilizing the Edge cloud 110 among multiple illustrative layers of network computing. The layers begin at an endpoint (devices and things) layer 200, which accesses the Edge cloud 110 to conduct data creation, analysis, and data consumption activities. The Edge cloud 110 may span multiple network layers, such as an Edge devices layer 210 having gateways, on-premise servers, or network equipment (nodes 215) located in physically proximate Edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the Edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the Edge devices layer 210, to even between 10 to 40 ms when communicating with nodes at the network access layer 220. Beyond the Edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 235 or a cloud data center 245, a central office or content data network may be considered as being located within a "near Edge" layer ("near" to the cloud, having high latency values when communicating with the devices and endpoints of the use cases 205), whereas an access point, base station, on-premise server, or network gateway may be considered as located within a "far Edge" layer ("far" from the cloud, having low latency values when communicating with the devices and endpoints of the use cases 205). It will be understood that other categorizations of a particular network layer as constituting a "close", "local", "near", "middle", or "far" Edge may be based on latency, distance, number of network hops, or other measurable characteristics, as measured from a source in any of the network layers 200-240.

The various use cases 205 may access resources under usage pressure from incoming streams, due to multiple services utilizing the Edge cloud. To achieve results with low latency, the services executed within the Edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 110 (network layers 200-240), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 110.

As such, the Edge cloud 110 is formed from network components and functional features operated by and within Edge gateway nodes, Edge aggregation nodes, or other Edge compute nodes among network layers 210-230. The Edge cloud 110 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 110 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks, etc.) may also be utilized in place of or in combination with such 3GPP carrier networks.

The network components of the Edge cloud 110 may be servers, multi-tenant servers, appliance computing devices, and/or any other type of computing devices. For example, the Edge cloud 110 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The Edge cloud 110 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Figure 3:
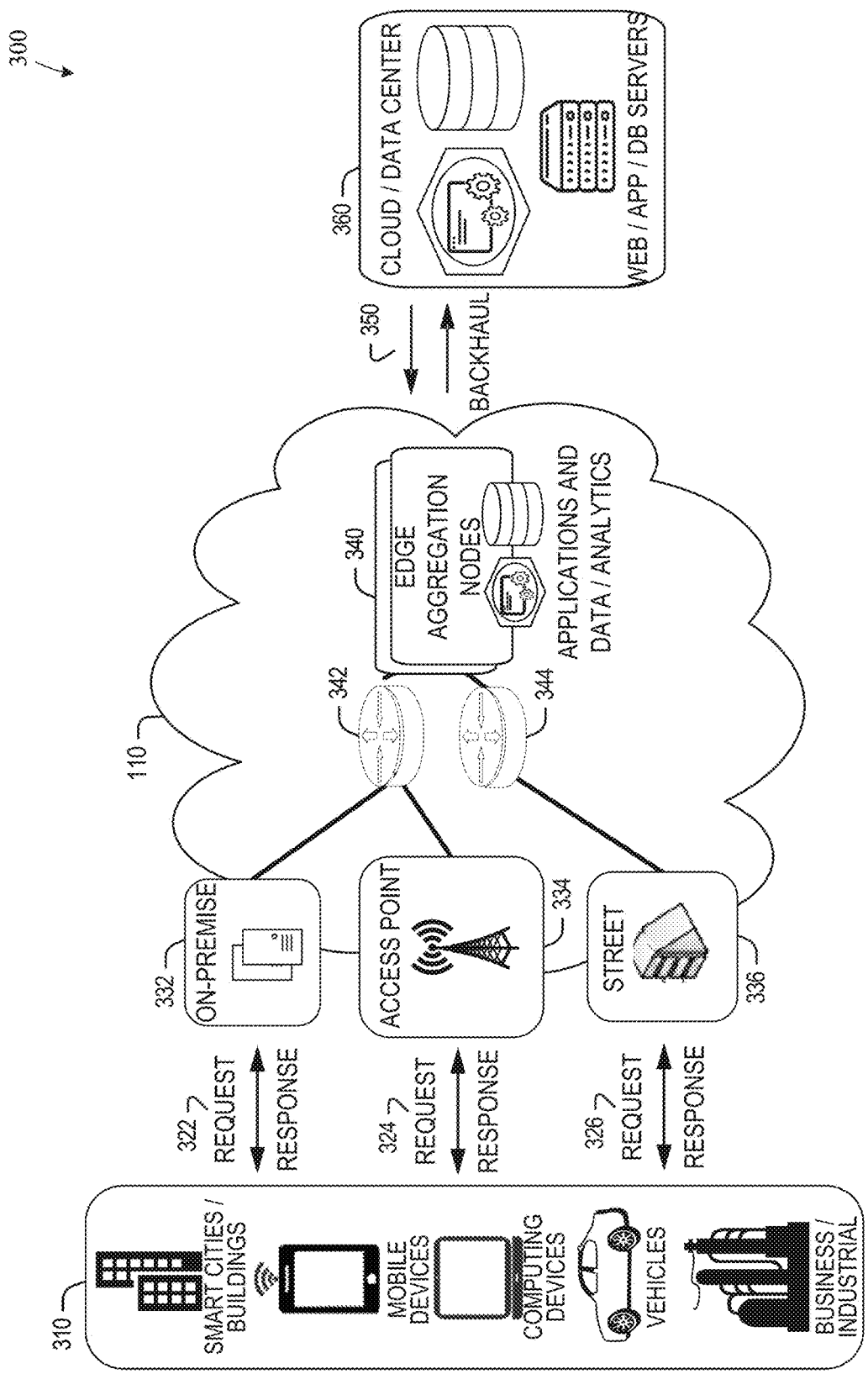
FIG. 3 illustrates an example approach for networking and services in an Edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., a cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the Edge cloud 110 to aggregate traffic and requests. Thus, within the Edge cloud 110, the TSP may deploy various compute and storage resources, such as at Edge aggregation nodes 340, to provide requested content. The Edge aggregation nodes 340 and other systems of the Edge cloud 110 are connected to a cloud or data center 360, which uses a backhaul network 350 to fulfill higher-latency requests from a cloud/data center for websites, applications, database servers, etc. Additional or consolidated instances of the Edge aggregation nodes 340 and the aggregation points 342, 344, including those deployed on a single server framework, may also be present within the Edge cloud 110 or other areas of the TSP infrastructure.

Figure 4:
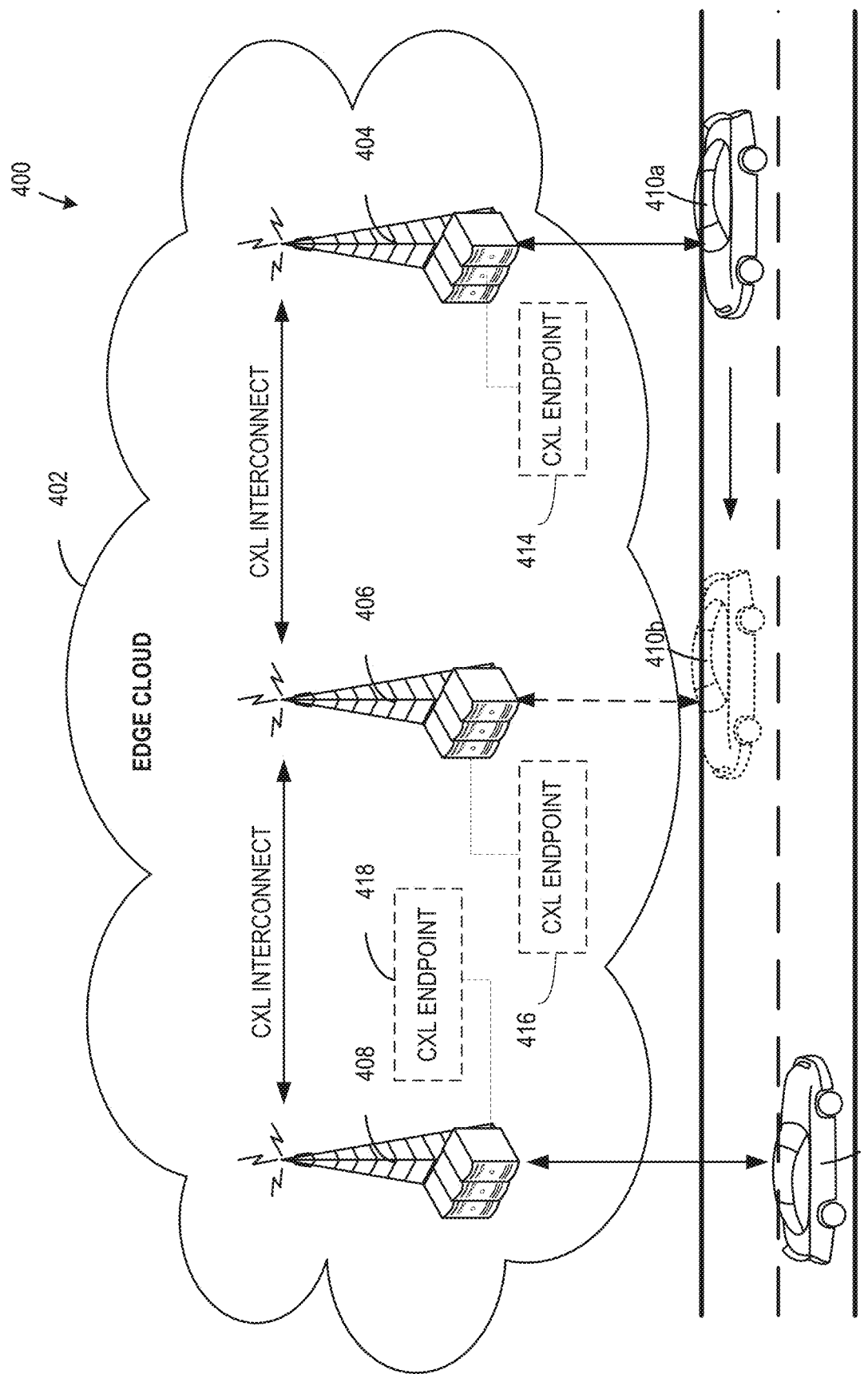
FIG. 4 is an example distributed coherent Edge computing system.

FIG. 4 illustrates an example distributed coherent Edge computing system 400 that can connect multiple example Edge compute nodes 404, 406, and 408 to form multiple Edge platforms and coherently share data between the Edge compute nodes 404, 406, and 408. In some examples, an autonomous vehicle 410a will need to offload some computations or store some data in an example Edge compute node 404. For the example illustrated in FIG. 4, in response to connecting the Edge compute node 404 and the Edge device 410a, the Edge compute node 404 implements an attached CXL endpoint 414 to link up with the Edge device 410a. The example CXL endpoint 414 can initialize the Edge device 410a data in main memory on the CXL endpoint 414 and the Edge compute node 404 using an example CXL.io protocol. The example CXL endpoint 414 can also discover at least one other of example Edge compute node(s) 406 within a topological frame by using the CXL.io protocol. The example CXL endpoint 414 can also use the CXL.io protocol to access the registers of the Edge compute nodes 404 and 406 to establish the framework for cache coherence. The example CXL endpoints 414, 416, and 418 can be attached to the servers of the example Edge compute nodes 404, 406, and 408 via an example peripheral component interconnect express (PCIe) electrical interface. The example CXL endpoint 414 can be a hardware device with its own CPU and structure to allow it to communicate to other devices over a network, such as a network interface controller (NIC).

In some examples, the CXL endpoint 414 can establish a CXL interconnect between the Edge compute nodes 404 and 406 to coherently share data between the two cached memories. In the examples disclosed herein, this subnetwork of interconnected Edge compute nodes 404 and 406 can be referred to as an example Edge platform. The example CXL endpoint 414 can connect the Edge platform using the CXL.io protocol and establish a coherent environment using the CXL.cache and/or CXL.mem protocol(s). In the examples disclosed herein, the CXL endpoint 414 uses coherency protocol(s) which can be modified CXL.cache protocol(s) and/or CXL.mem protocol(s) based on coherent memory domain(s) and/or coherency rule(s). In some examples, the CXL endpoint 414 uses the CXL.cache protocol to establish a fully coherent environment in which data is updated or invalidated continuously. In other examples, the CXL endpoint 414 uses the coherency protocol(s) to establish a selectively coherent environment and share data and/or accesses memory(ies) across the Edge network based on coherent memory domain(s) and/or coherency rule(s). When the example Edge device 410a is writing or reading data to or from the Edge compute node 404, changes in the data can be snooped by the CXL endpoint 414 and propagated to the other CXL endpoint 416 in the Edge platform using the coherency protocol(s). Therefore, when the example Edge device 410a moves its position to 410b and establishes a new connection with an example Edge compute node 406, the data relevant to the Edge device 410b is already cached and does not need to be reinitialized by the CXL endpoint 416.

In further examples, the example distributed coherent Edge network 400 can include another example Edge device 412 and another example Edge compute node 408. In the example illustrated in FIG. 4, the Edge devices 410a and 412 can be autonomous vehicles that are sharing location data with the example Edge compute nodes 404 and 408. The example Edge device 410a may need to be aware of the geographical location of the example Edge device 412, so the example CXL endpoints 414 and 418 can establish a CXL interconnect between two example Edge platforms that contain the example Edge compute nodes 404 and 408. When the Edge device 410a sends a read request of the coordinate position of the Edge device 412 to the Edge compute node 404, the CXL endpoint 414 can return the data from its own cached memory (if it is valid) or from the cached memory of the CXL endpoint 418. Also, when the Edge device 410a writes and validates a new example coordinate position data to the Edge compute node 404 (using CXL.mem), the CXL endpoint 414 can send an invalidate command to CXL endpoint 418 for that memory address stored in cache memory (using the coherency protocol(s)). Therefore, if the example Edge device 412 sends a read request to the CXL endpoint 418 for the same data, the CXL endpoint 418 will have to snoop the CXL endpoint 414 for the valid data.

Figure 5:
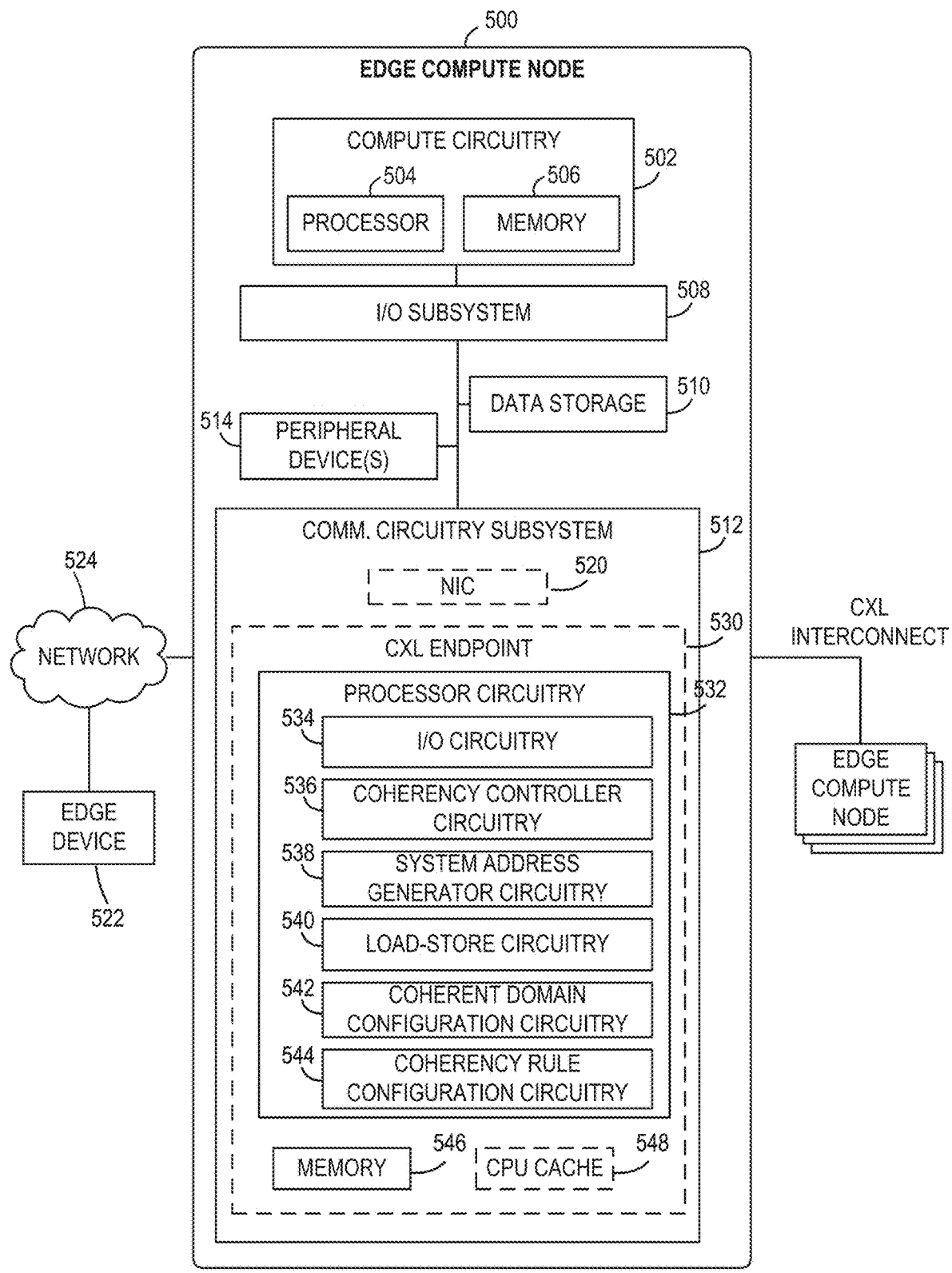
FIG. 5 provides an overview of example components for compute deployed at an example Edge compute node and at least one other Edge compute node(s) connected via an example CXL interconnect in a distributed coherent Edge computing system.

FIG. 5 illustrates an example Edge compute node 500 in greater detail showing processor circuitry components of the example CXL endpoint 530 device and where it can be attached to the Edge compute node 500. The CXL endpoint can be attached to an example communication circuitry subsystem 512 via peripheral component interconnect express (PCIe) 5.0 electrical interface. The example CXL endpoint 530 can be an accelerator that can be designed to perform tasks for an example processor 504 more efficiently, for example a central processing unit (CPU), graphics processing unit (GPU), field-programmable gate array (FPGA), or an application-specific integrated circuit (ASIC). The example CXL endpoint 530 can also be a NIC with its own processor circuitry 532, memory 546, and the ability to connect multiple devices across a network.

In some examples, the CXL endpoint 530 can contain an example processor circuitry 532 that can perform tasks to establish and maintain coherency across an example Edge platform. The example processor circuitry 532 can include an example input/output (I/O) circuitry 534 to use an example CXL.io protocol to detect, connect to, initialize, and access registers of other devices within an example distributed coherent Edge computing system 400. The example I/O circuitry 534 can establish a link with an example Edge device 522 over an example network 524. In some examples, the CXL endpoint 530 could also perform a link-up between two or more devices for the purpose of data transmission. In some examples, this can be a physical link or virtual circuit between two example Edge compute nodes. The example I/O circuitry 534 can also use the CXL.io protocol to initialize data from the Edge device 522 by assigning an initial value and memory address to a data object or variable stored in a memory block within an example memory 546 or an example cache 548. In some examples, the I/O circuitry can also use CXL.io to perform network enumeration to discover other hosts or devices, group information, and Edge services within a shared Edge network. The example I/O circuitry could also use the CXL.io protocol to access registers within a host processor and attached device's processors. These registers could, for example, include a general-purpose register, which are a hardware architecture that can store both data and addresses within easily accessible example cache memory 548.

In some examples, the I/O circuitry 534 illustrated in FIG. 5 can configure an example Edge platform that contains the Edge compute node 500 and one or more other Edge compute node(s) 526 that are connected via an example CXL interconnect. The example I/O circuitry 534 can configure one Edge compute node to be an example home Edge compute node to store some or all of the Edge device data in main memory 506. One or more example Edge compute nodes that are connected to the example home Edge compute node can be referred to as auxiliary Edge compute node(s). The example I/O circuitry 534 can configure the example home Edge compute node by implementing the I/O circuitry 534 that uses the example CXL.io protocol. The example logic to be executed by the I/O circuitry 534 can be written to configure the home Edge compute node based on the topology of the home Edge compute node relative to the auxiliary Edge compute nodes, architecture of the home Edge compute node, type of Edge service dedicated to the Edge device in communication with the Edge platform, or any other example reasoning or variables in the logic. The example Edge compute node 500 is not necessarily the home Edge compute node in the examples disclosed herein. The example home Edge compute node and the example auxiliary Edge compute node(s) can contain the same components and structure; both can include an attached CXL endpoint that may be similar to the example CXL endpoint 530. In further examples, the Edge device can be connected to only the home Edge compute node, only one auxiliary Edge compute node, the home Edge compute node and one or more other auxiliary Edge compute node(s) simultaneously, or multiple auxiliary Edge compute nodes simultaneously.

In some examples, the memory 546 can be implemented as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In some examples, the CPU cache 548 can be a hardware cache used by the processor circuitry 532 to temporarily store data from the main memory 546 or other caches in the example Edge platform for faster computing. The example cache 548 can be of a smaller capacity than the memory 546 and can be located physically closer to the processor core for efficient computing. The example cache 548 illustrated in FIG. 5 can containing multiple levels and combinations of an instruction cache, data cache, and translation lookaside buffer. Any potential level of the example cache 548 can be implemented as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM).

One particular type of DRAM that may be used in a memory module is synchronous dynamic random access memory (SDRAM).

In some examples, the CXL endpoint 530 can include at least one of an example system address generator circuitry 538 within the processor circuitry 532. The example system address generator circuitry 538 can be an execution unit or an arithmetic logic unit within the processor circuitry 532 that can calculate memory addresses used by other circuitry within the processor circuitry 532 or by other CXL endpoints in different Edge compute nodes 526 within the distributed coherent Edge computing system 400. The example memory address calculated by the example system address generator 538 can be used to locate the memory location of data targeted for read or write requests. The example system address generator circuitry 538 can operate parallel to the rest of the processor circuitry to calculate memory addresses required for fetching data from the memory 546 or the CPU cache 548. The example system address generator circuitry 538 can perform arithmetic operations, such as addition, subtraction, modulo operations, bit shifts, etc. to encode or decode the memory address of example data that is to be read or modified by the processor circuitry.

In some examples, the CXL endpoint 530 illustrated in FIG. 5 can include an example coherent domain configuration circuitry 542 within the example processor circuitry 532. The example coherent domain configuration circuitry 542 can use example coherent memory domain logic written into example coherency protocol(s) to configure the memory addresses of an example client device 522 into subsets of memory that need to remain coherent in the distributed coherent Edge computing system. The example coherent domain configuration circuitry 542 can execute the memory domain logic to determine the coherent memory domain(s) based on the initialized data at the memory addresses provided by the Edge device 522, the technological classification of the Edge device 522, the type of service being provided by the distributed coherent Edge computing service 400 to the client device 522, or any other example reasoning or variables in the logic. For example, if an example autonomous vehicle is connected with the example Edge compute node 500, its data and associated memory addresses could be stored on to either an example memory 506 or the example memory 546. However, some of these example memory addresses may not always need to be shared across the distributed coherent Edge computing system 400. The example coherent memory domain logic may dictate that external temperature data measured by the example autonomous vehicle is not important enough to be shared across the system and would therefore not need to be included in the coherent memory domain(s). The example coherent domain configuration circuitry 542 can read the memory address decoded by the system address generator and determine whether it should be included in the coherent memory domain(s).

In some examples, the CXL endpoint 530 illustrated in FIG. 5 can include processor circuitry 532 that can implement an example coherency rule(s) configuration circuitry 544. The example coherency rule(s) configuration circuitry 544 can use example coherency rule(s) logic written into the example coherency protocol(s) to configure an example coherency rule(s) that is to be associated with the coherent memory domain(s). The example coherency rule(s) can be fully coherent, partially coherent, non-coherent, or other example levels of coherency as per example reasoning or variables in the logic. In other words, the example CXL endpoint 530 can share all, some, or none of the cached data in the coherent memory domain(s) with the rest of the distributed coherent Edge computing system 400. The example coherency rule(s) can also be time-dependent, meaning that certain addresses within the coherent memory domain(s) may only need to be updated in other caches after a specified length of time rather than at every instance a data modification occurs.

In some examples, the CXL endpoint 530 illustrated in FIG. 5 can include processor circuitry 532 that implements an example coherency controller circuitry 536 to use example the coherency protocol(s) to configure and maintain cache coherence across the example distributed coherent Edge computing network 400. The example coherency controller circuitry 536 can use the coherency protocol(s) to perform snoops on the memory 506 of the Edge compute node 500 at which the CXL endpoint 530 is operating or on caches of other CXL endpoints in the various Edge compute nodes 526 across the distributed coherent Edge computing system 400.

In some examples, the example coherency controller circuitry 536 can selectively snoop the cached memory in other devices when performing a read request from the example Edge device 522. If an example memory address of the requested data is valid and stored in the cached memory 548 of the example CXL endpoint 530, then the coherency controller circuitry 536 can return a hit and transmit that data value to the Edge device 522. If the example memory address is invalid or is not stored in the cached memory 548, then the coherency controller can return a miss and snoop the main memory 546 or the cached memory of other example CXL endpoints in the example Edge compute nodes 526. However, the example coherency controller circuitry 536 may snoop the other caches in the system if the memory address(es) of the requested data fall into an example coherent memory domain(s) and the coherent memory domain(s) are associated with example coherency rule(s) that define the given circumstance as coherent.

In some examples, the example coherency controller circuitry 536 can selectively snoop the cached memory in other devices when performing a write request from the example Edge device 522. An example data value written by the Edge device 522 and the associated memory address can be transmitted to the CXL endpoint 530. The example coherency controller circuitry 536 can then write the new data value into the example memory address in the cached memory 548. The example coherency controller circuitry 536 can then invalidate the example memory address in all the other cached memories in the example Edge compute nodes 526 in the distributed coherent Edge computing system 400 if the memory address falls into example coherent memory domain(s) and the coherent memory domain(s) are associated with example coherency rule(s) that define the given circumstance as coherent. If the example memory address is not within the coherent memory domain(s) or if it is not of a coherency rule(s) that requires coherence for the given circumstance, then the memory address within the cached memories of the other Edge compute nodes 526 in the system remain valid.

In some examples, the CXL endpoint 530 can include an example processor circuitry 532 that includes an example load-store circuitry 540 that uses the CXL.mem protocol. The example load-store circuitry 540 can provide an example memory 506 with data stored in the example memory 546 or the example cached memory 548. The example load-store circuitry 540 can also provide an example memory 546 with data stored in the example CPU cache 548. The example load-store circuitry 540 can also provide an example main memory or cached memory of other example CXL endpoints in the example Edge compute node(s) 526 with the data stored in the example memory 546 or the example cached memory 548.

In further examples, any of the compute nodes or devices discussed with reference to the present Edge computing systems and environment may be fulfilled based on the components depicted in FIGS. 5 and 6. Respective Edge compute nodes may be embodied as a type of device, appliance, computer, or other "thing" capable of communicating with other Edge, networking, or endpoint components. For example, an Edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

In the simplified example depicted in FIG. 5, an Edge compute node 500 includes a compute engine (also referred to herein as "compute circuitry") 502, an input/output (I/O) subsystem (also referred to herein as "I/O circuitry") 508, data storage (also referred to herein as "data storage circuitry") 510, a communication circuitry subsystem 512, and, optionally, one or more peripheral devices (also referred to herein as "peripheral device circuitry") 514. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 500 may be embodied as any type of engine, device, or collection of devices capable of performing various compute functions. In some examples, the compute node 500 may be embodied as a single device such as an integrated circuit, an embedded system, a field-programmable gate array (FPGA), a system-on-a-chip (SOC), or other integrated system or device. In the illustrative example, the compute node 500 includes or is embodied as a processor (also referred to herein as "processor circuitry") 504 and a memory (also referred to herein as "memory circuitry") 506. The processor 504 may be embodied as any type of processor(s) capable of performing the functions described herein (e.g., executing an application). For example, the processor 504 may be embodied as a multi-core processor(s), a microcontroller, a processing unit, a specialized or special purpose processing unit, or other processor or processing/controlling circuit.

In some examples, the processor 504 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 504 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs, programmed FPGAs, or ASICs tailored to implement an AI model such as a neural network). Such an xPU may be designed to receive, retrieve, and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, an SOC, a CPU, and other variations of the processor 504 may work in coordination with each other to execute many types of operations and instructions within and on behalf of the compute node 500.

The memory 506 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 506 may be integrated into the processor 504. The memory 506 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 502 is communicatively coupled to other components of the compute node 500 via the I/O subsystem 508, which may be embodied as circuitry and/or components to facilitate input/output operations with the compute circuitry 502 (e.g., with the processor 504 and/or the main memory 506) and other components of the compute circuitry 502. For example, the I/O subsystem 508 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 508 may form a portion of a system-on-a-chip (SoC) and be incorporated, along with one or more of the processor 504, the memory 506, and other components of the compute circuitry 502, into the compute circuitry 502.

The one or more illustrative data storage devices/disks 510 may be embodied as one or more of any type(s) of physical device(s) configured for short-term or long-term storage of data such as, for example, memory devices, memory, circuitry, memory cards, flash memory, hard disk drives (HDDs), solid-state drives (SSDs), and/or other data storage devices/disks. Individual data storage devices/disks 510 may include a system partition that stores data and firmware code for the data storage device/disk 510. Individual data storage devices/disks 510 may also include one or more operating system partitions that store data files and executables for operating systems depending on, for example, the type of compute node 500.

The communication circuitry 512 may be embodied as any communication circuit, device, or collection thereof, capable of enabling communications over a network between the compute circuitry 502 and another compute device (e.g., an Edge gateway of an implementing Edge computing system). The communication circuitry 512 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 512 includes a network interface controller (NIC) 520, which may also be referred to as a host fabric interface (HFI). The NIC 520 may be embodied as one or more add-in-boards, daughter cards, network interface cards, controller chips, chipsets, or other devices that may be used by the compute node 500 to connect with another compute device (e.g., an Edge gateway node). In some examples, the NIC 520 may be embodied as part of a system-on-a-chip (SoC) that includes one or more processors, or included on a multichip package that also contains one or more processors. In some examples, the NIC 520 may include a local processor (not shown) and/or a local memory (not shown) that are both local to the MC 520. In such examples, the local processor of the NIC 520 may be capable of performing one or more of the functions of the compute circuitry 502 described herein. Additionally, or alternatively, in such examples, the local memory of the NIC 520 may be integrated into one or more components of the client compute node at the board level, socket level, chip level, and/or other levels.

Additionally, in some examples, a respective compute node 500 may include one or more peripheral devices 514. Such peripheral devices 514 may include any type of peripheral device found in a compute device or server such as audio input devices, a display, other input/output devices, interface devices, and/or other peripheral devices, depending on the particular type of the compute node 500. In further examples, the compute node 500 may be embodied by a respective Edge compute node (whether a client, gateway, or aggregation node) in an Edge computing system or like forms of appliances, computers, subsystems, circuitry, or other components.

Figure 6:
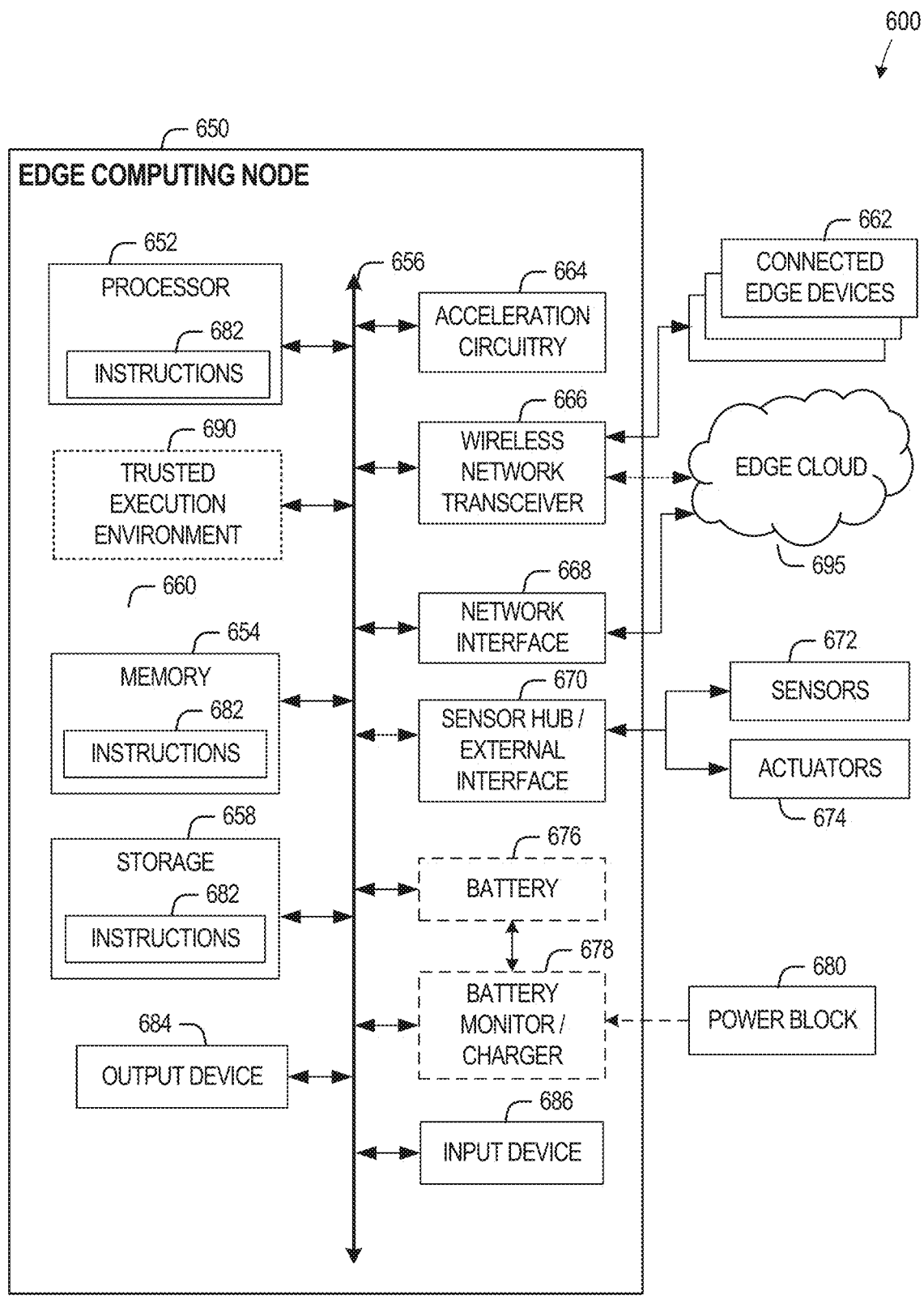
FIG. 6 provides a further overview of example components within an Edge computing node in a distributed coherent Edge computing system.

In a more detailed example, FIG. 6 illustrates a block diagram of an example of components that may be present in an Edge computing node 650 for implementing the techniques (e.g., operations, processes, methods, and methodologies) described herein. This Edge computing node 650 provides a closer view of the respective components of node 600 when implemented as or as part of a computing device (e.g., as a mobile device, a base station, server, gateway, etc.). The Edge computing node 650 may include any combination of the hardware or logical components referenced herein, and it may include or couple with any device usable with an Edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the Edge computing node 650, or as components otherwise incorporated within a chassis of a larger system.

The Edge computing device 650 may include processing circuitry in the form of a processor 652, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 652 may be a part of a system on a chip (SoC) in which the processor 652 and other components are formed into a single integrated circuit, or a single package, such as the Edison™ or Galileo™ SoC boards from Intel Corporation, Santa Clara, California. As an example, the processor 652 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 652 and accompanying circuitry may be provided in a single socket form factor, multiple socket form factor, or a variety of other formats, including in limited hardware configurations or configurations that include fewer than all elements shown in FIG. 6.

The processor 652 may communicate with a system memory 654 over an interconnect 656 (e.g., a bus). Any number of memory devices may be used to provide for a given amount of system memory. As examples, the memory 654 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example, the storage 658 may be implemented via a solid-state disk drive (SSDD). Other devices that may be used for the storage 658 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 656 may couple the processor 652 to a transceiver 666, for communications with the connected Edge devices 662. The transceiver 666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected Edge devices 662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 666 (or multiple transceivers) may communicate using multiple standards or radios for communications at a different range. For example, the Edge computing node 650 may communicate with close devices, e.g., within about 10 meters, using a local transceiver based on Bluetooth Low Energy (BLE), or another low power radio, to save power. More distant connected Edge devices 662, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 666 (e.g., a radio transceiver) may be included to communicate with devices or services in a cloud (e.g., an Edge cloud 695) via local or wide area network protocols. The wireless network transceiver 666 may be a low-power wide-area (LPWA) transceiver that follows the IEEE 802.15.4, or IEEE 802.15.4g standards, among others. The Edge computing node 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 666, as described herein. For example, the transceiver 666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 668 may be included to provide a wired communication to nodes of the Edge cloud 695 or to other devices, such as the connected Edge devices 662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to enable connecting to a second network, for example, a first NIC 668 providing communications to the cloud over Ethernet, and a second NIC 668 providing communications to other devices over another type of network.

Given the variety of types of applicable communications from the device to another component or network, applicable communications circuitry used by the device may include or be embodied by any one or more of components 664, 666, 668, or 670. Accordingly, in various examples, applicable means for communicating (e.g., receiving, transmitting, etc.) may be embodied by such communications circuitry.

The Edge computing node 650 may include or be coupled to acceleration circuitry 664, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific Edge computing tasks for service management and service operations discussed elsewhere in this document.

The interconnect 656 may couple the processor 652 to a sensor hub or external interface 670 that is used to connect additional devices or subsystems. The devices may include sensors 672, such as accelerometers, level sensors, flow sensors, optical light sensors, camera sensors, temperature sensors, global navigation system (e.g., GPS) sensors, pressure sensors, barometric pressure sensors, and the like. The hub or interface 670 further may be used to connect the Edge computing node 650 to actuators 674, such as power switches, valve actuators, an audible sound generator, a visual warning device, and the like.

In some optional examples, various input/output (I/O) devices may be present within or connected to, the Edge computing node 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the Edge computing node 650. A display or console hardware, in the context of the present system, may be used to provide output and receive input of an Edge computing system; to manage components or services of an Edge computing system; identify a state of an Edge computing component or service; or to conduct any other number of management or administration functions or service use cases.

A battery 676 may power the Edge computing node 650, although, in examples in which the Edge computing node 650 is mounted in a fixed location, it may have a power supply coupled to an electrical grid, or the battery may be used as a backup or for temporary capabilities. The battery 676 may be a lithium ion battery, or a metal-air battery, such as a zinc-air battery, an aluminum-air battery, a lithium-air battery, and the like.

A battery monitor/charger 678 may be included in the Edge computing node 650 to track the state of charge (SoCh) of the battery 676, if included. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 678 may communicate the information on the battery 676 to the processor 652 over the interconnect 656. The battery monitor/charger 678 may also include an analog-to-digital (ADC) converter that enables the processor 652 to directly monitor the voltage of the battery 676 or the current flow from the battery 676. The battery parameters may be used to determine actions that the Edge computing node 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the Edge computing node 650. A wireless battery charging circuit, such as an LTC4020 chip from Linear Technologies of Milpitas, California, among others, may be included in the battery monitor/charger 678. The specific charging circuits may be selected based on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

In an example, the instructions 682 provided via the memory 654, the storage 658, or the processor 652 may be embodied as a non-transitory, machine-readable medium 660 including code to direct the processor 652 to perform electronic operations in the Edge computing node 650. The processor 652 may access the non-transitory, machine-readable medium 660 over the interconnect 656. For instance, the non-transitory, machine-readable medium 660 may be embodied by devices described for the storage 658 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 660 may include instructions to direct the processor 652 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 682 on the processor 652 (separately, or in combination with the instructions 682 of the machine readable medium 660) may configure execution or operation of a trusted execution environment (TEE) 690. In an example, the TEE 690 operates as a protected area accessible to the processor 652 for secure execution of instructions and secure access to data. Various implementations of the TEE 690, and an accompanying secure area in the processor 652 or the memory 654 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 650 through the TEE 690 and the processor 652.

While the illustrated examples of FIG. 5 and FIG. 6 include example components for a compute node and a computing device, respectively, examples disclosed herein are not limited thereto. As used herein, a "computer" may include some or all of the example components of FIGS. 5 and/or 6 in different types of computing environments. Example computing environments include Edge computing devices (e.g., Edge computers) in a distributed networking arrangement such that particular ones of participating Edge computing devices are heterogenous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIGS. 5 and/or 6, each of which may include different sub-components, different memory capacities, I/O capabilities, etc. For example, because some implementations of distributed networking and/or distributed computing are associated with particular desired functionality, examples disclosed herein include different combinations of components illustrated in FIGS. 5 and/or 6 to satisfy functional objectives of distributed computing tasks. In some examples, the term "compute node" or "computer" only includes the example processor 504, memory 506 and I/O subsystem 508 of FIG. 5. In some examples, one or more objective functions of a distributed computing task(s) rely on one or more alternate devices/structure located in different parts of an Edge networking environment, such as devices to accommodate data storage (e.g., the example data storage 510), input/output capabilities (e.g., the example peripheral device(s) 514), and/or network communication capabilities (e.g., the example NIC 520).

In some examples, computers operating in a distributed computing and/or distributed networking environment (e.g., an Edge network) are structured to accommodate particular objective functionality in a manner that reduces computational waste. For instance, because a computer includes a subset of the components disclosed in FIGS. 5 and 6, such computers satisfy execution of distributed computing objective functions without including computing structure that would otherwise be unused and/or underutilized. As such, the term "computer" as used herein includes any combination of structure of FIGS. 5 and/or 6 that is capable of satisfying and/or otherwise executing objective functions of distributed computing tasks. In some examples, computers are structured in a manner commensurate to corresponding distributed computing objective functions in a manner that downscales or upscales in connection with dynamic demand. In some examples, different computers are invoked and/or otherwise instantiated in view of their ability to process one or more tasks of the distributed computing request(s), such that any computer capable of satisfying the tasks proceed with such computing activity.

In the illustrated examples of FIGS. 5 and 6, computing devices include operating systems. As used herein, an "operating system" is software to control example computing devices, such as the example Edge compute node 500 of FIG. 5 and/or the example Edge compute node 650 of FIG. 6. Example operating systems include, but are not limited to consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first Edge compute node includes a real-time operating system having particular performance expectations of responsivity to dynamic input conditions, and a second operating system corresponding to a second Edge compute node includes graphical user interface capabilities to facilitate end-user I/O.

In some examples, the CXL endpoint 530 includes means for using CXL.io protocols, as well as inputting and/or outputting read and/or write requests from Edge devices. For example, the means for using may be implemented by I/O circuitry 534. In some examples, the I/O circuitry 534 may be implemented by machine executable instructions such as that implemented by at least blocks 702, 720, 802, and 902-906 of FIGS. 7-9 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the I/O circuitry 534 is implemented by other hardware logic circuitry, hardware implemented state machines, and/or any other combination of hardware, software, and/or firmware. For example, the I/O circuitry 534 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the CXL endpoint 530 includes means for using coherency protocol(s). For example, the means for using may be implemented by coherency controller circuitry 536. In some examples, the coherency controller circuitry 536 may be implemented by machine executable instructions such as that implemented by at least blocks 706-716, 806-816, 910, and 914 of FIGS. 7-9 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the coherency controller circuitry 536 is implemented by other hardware logic circuitry, hardware implemented state machines, and/or any other combination of hardware, software, and/or firmware. For example, the coherency controller circuitry 536 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the CXL endpoint 530 includes means encoding and decoding memory addresses for data stored in memory. For example, the means for encoding and decoding may be implemented by system address generator circuitry 538. In some examples, the system address generator circuitry 538 may be implemented by machine executable instructions such as that implemented by at least blocks 704 and 804 of FIGS. 7 and 8 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the system address generator circuitry 538 is implemented by other hardware logic circuitry, hardware implemented state machines, and/or any other combination of hardware, software, and/or firmware. For example, the system address generator circuitry 538 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the CXL endpoint 530 includes means for using CXL.mem protocols. For example, the means for using may be implemented by load-store circuitry 540. In some examples, the load-store circuitry 540 may be implemented by machine executable instructions such as that implemented by at least blocks 718 and 818 of FIGS. 7 and 8 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the load-store circuitry 540 is implemented by other hardware logic circuitry, hardware implemented state machines, and/or any other combination of hardware, software, and/or firmware. For example, the load-store circuitry 540 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the CXL endpoint 530 includes means for configuring the coherent memory domain(s). For example, the means for configuring may be implemented by coherent domain configuration circuitry 542. In some examples, the coherent domain configuration circuitry 542 may be implemented by machine executable instructions such as that implemented by at least blocks 908 of FIG. 9 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the coherent domain configuration circuitry 542 is implemented by other hardware logic circuitry, hardware implemented state machines, and/or any other combination of hardware, software, and/or firmware. For example, the coherent domain configuration circuitry 542 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the CXL endpoint 530 includes means for configuring the coherency rule(s) for the coherent memory domain(s). For example, the means for configuring may be implemented by coherency rule(s) configuration circuitry 544. In some examples, the coherency rule(s) configuration circuitry 544 may be implemented by machine executable instructions such as that implemented by at least blocks 912 of FIG. 9 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the coherency rule(s) configuration circuitry 544 is implemented by other hardware logic circuitry, hardware implemented state machines, and/or any other combination of hardware, software, and/or firmware. For example, the coherency rule(s) configuration circuitry 544 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 10:
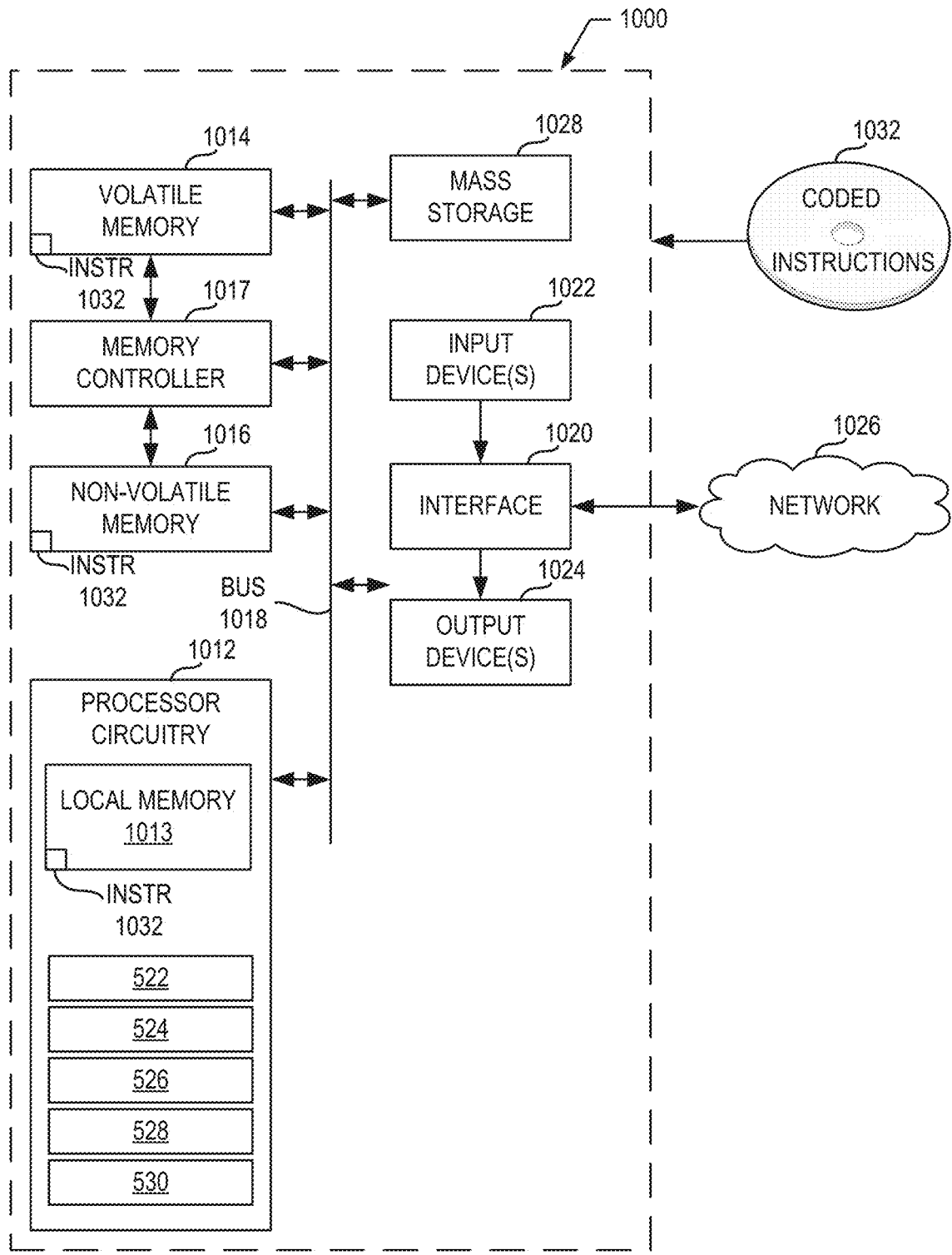
FIG. 10 is a block diagram of an example processing platform including processor circuitry structured to execute the example machine readable instructions of FIGS. 7, 8, and 9 to implement the example CXL endpoint.

While an example manner of implementing the CXL endpoint 530 of FIG. 5 is illustrated in FIG. 10, one or more of the elements, processes, and/or devices illustrated in FIG. 10 may be combined, divided, re-arranged, omitted, eliminated, and/or implemented in any other way. Further, the example I/O circuitry 534, the example coherency controller circuitry 536, the example system address generator circuitry 538, the example load-store circuitry 540, the example coherent domain configuration circuitry 542, the example coherency rule(s) configuration circuitry 542, and/or, more generally, the example CXL endpoint 530 of FIG. 5, may be implemented by hardware alone or by hardware in combination with software and/or firmware. Thus, for example, any of the example I/O circuitry 534, the example coherency controller circuitry 536, the example system address generator circuitry 538, the example load-store circuitry 540, the example coherent domain configuration circuitry 542, the example coherency rule(s) configuration circuitry 542, and/or, more generally, the example CXL endpoint 530, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example CXL endpoint 530 of FIG. 5 may include one or more elements, processes, and/or devices in addition to, or instead of, those illustrated in FIG. 10, and/or may include more than one of any or all of the illustrated elements, processes and devices.

A flowchart representative of example hardware logic circuitry, machine readable instructions, hardware implemented state machines, and/or any combination thereof for implementing the CXL endpoint 530 of FIG. 5 is shown in FIG. 10. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 7, 8, and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 10, many other methods of implementing the example CXL endpoint 530 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in Edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7, 8, and 9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 7:
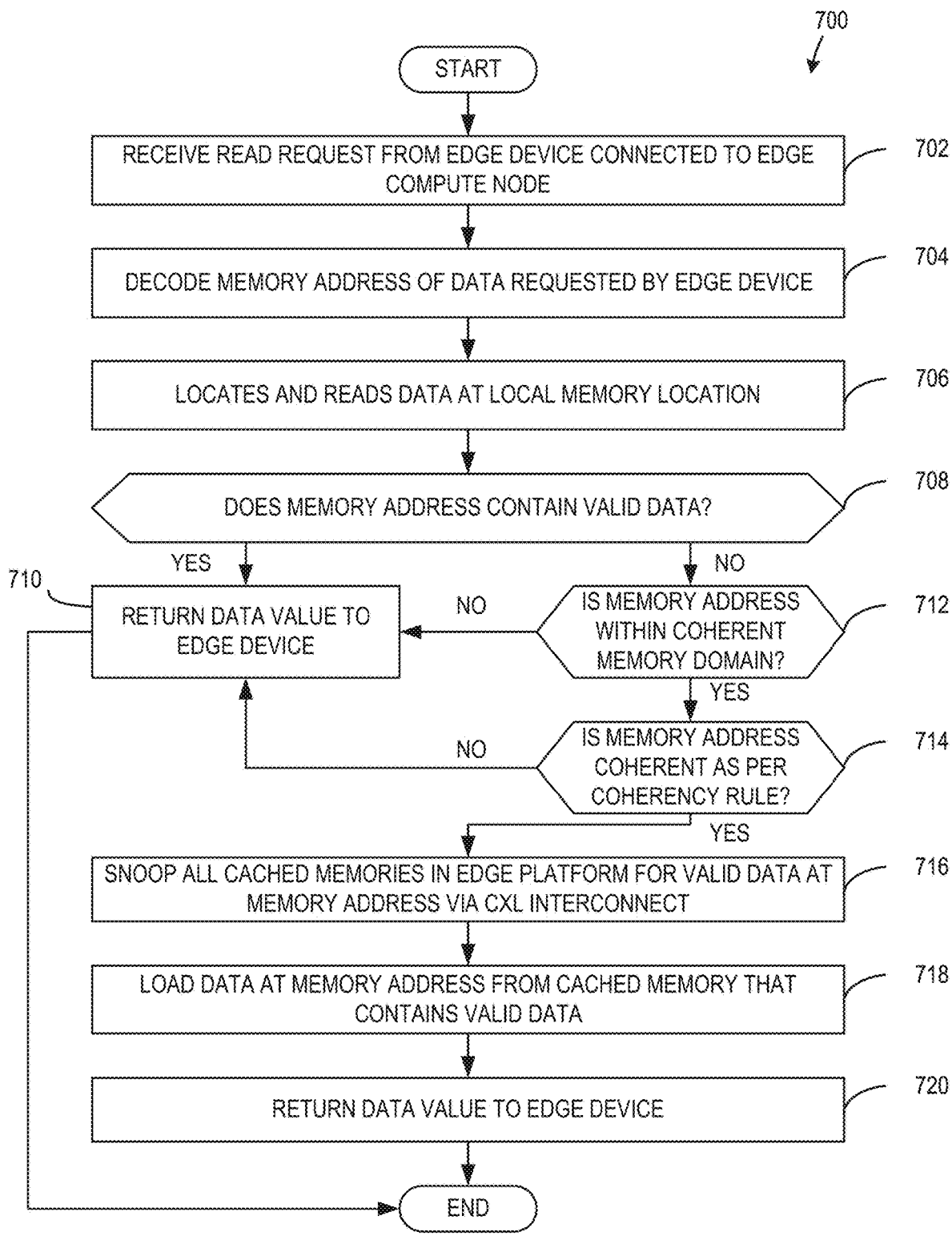
FIG. 7 is a flowchart representative of example machine readable instructions that may be executed by example processor circuitry to implement read requests to an example CXL endpoint in a distributed coherent Edge computing system.

FIG. 7 is a flowchart representative of example machine readable instructions and/or example operations 700 that may be executed and/or instantiated by processor circuitry to implement the CXL endpoint 530 to return a read request from a distributed coherent Edge computing network 400 to an Edge device 522 connected to an Edge compute node 500. The machine readable instructions and/or operations 700 of FIG. 7 begin at block 702, at which the I/O circuitry 534 receives a read request input from the Edge device 522.

At block 704, the system address generator circuitry 538 performs calculations to decode the memory address associated with the data read request sent from the Edge device 522. The memory address being a reference to the memory location of the data to be read by the coherency controller circuitry 536.

At block 706, in response to the memory address being input to the coherency controller circuitry 536, the coherency controller circuitry 536 locates and reads the data stored at the local memory location as referenced by the memory address. In such an example, the local memory location is either the cache memory 548 or the main memory 546 of the CXL endpoint 530 or the memory 506 of the Edge compute node 500. The coherency controller circuitry 536 searches the cache memory 548 first as searching the cache memory 548 tends to result in the quickest data detection and/or retrieval.

At block 708, the coherency controller circuitry 536 reads the memory block in which the data and the valid or invalid Boolean metadata is stored. The coherency controller circuitry 536 determines if the data is stored locally either on the CXL endpoint 530 and if the Edge compute node 500 is valid or invalid.

At block 710, if the coherency controller circuitry 536 determines that the data is valid, then it will return the data value to the Edge device 522 that performed the read request.

At block 712, if the coherency controller circuitry 536 determines that the data is invalid, then the coherency controller circuitry 536 determines if the memory address is within the coherent memory domain(s). The coherency controller circuitry 536 uses the configurations implemented by the coherent domain configuration circuitry 542 to check if the memory address of the read data is in the coherent memory domain(s). If it is not, then the coherency controller circuitry 536 returns the data value to the Edge device 522 that performed the read request.

At block 714, if the coherency controller circuitry 536 determines that the memory address is within the coherent memory domain(s), then the coherency controller circuitry 536 determines if the memory address should remain coherent as per the coherency rule(s) configured by the coherency rule(s) configuration circuitry 544. If the coherency rule(s) classifies the memory address as non-coherent at the given moment, then the coherency controller circuitry 536 returns the data value to the Edge device 522 that performed the read request.

At block 716, if the coherency controller circuitry 536 determines that the memory address as coherent per the coherency rule(s), then the coherency controller circuitry 536 snoops the CXL interconnect for the memory address in the various cache memories of the other CXL endpoints. The snoop sends out a signal to the other CXL endpoints to call for data marked valid at the memory location referenced by the memory address, the other CXL endpoints search their cached data for the memory address, and one of the CXL endpoints returns the value (from its cache memory or main memory) to the CPU cache 548.

At block 718, the load-store circuitry 540 loads the data stored in the CPU cache 548 by the coherency controller circuitry 536 to be sent back to the Edge device 522.

At block 720, the I/O circuitry 534 outputs the data value to the Edge device 522. The example machine readable instructions and/or example operations 700 repeat every time the Edge device sends a read request to the CXL endpoint.

Figure 8:
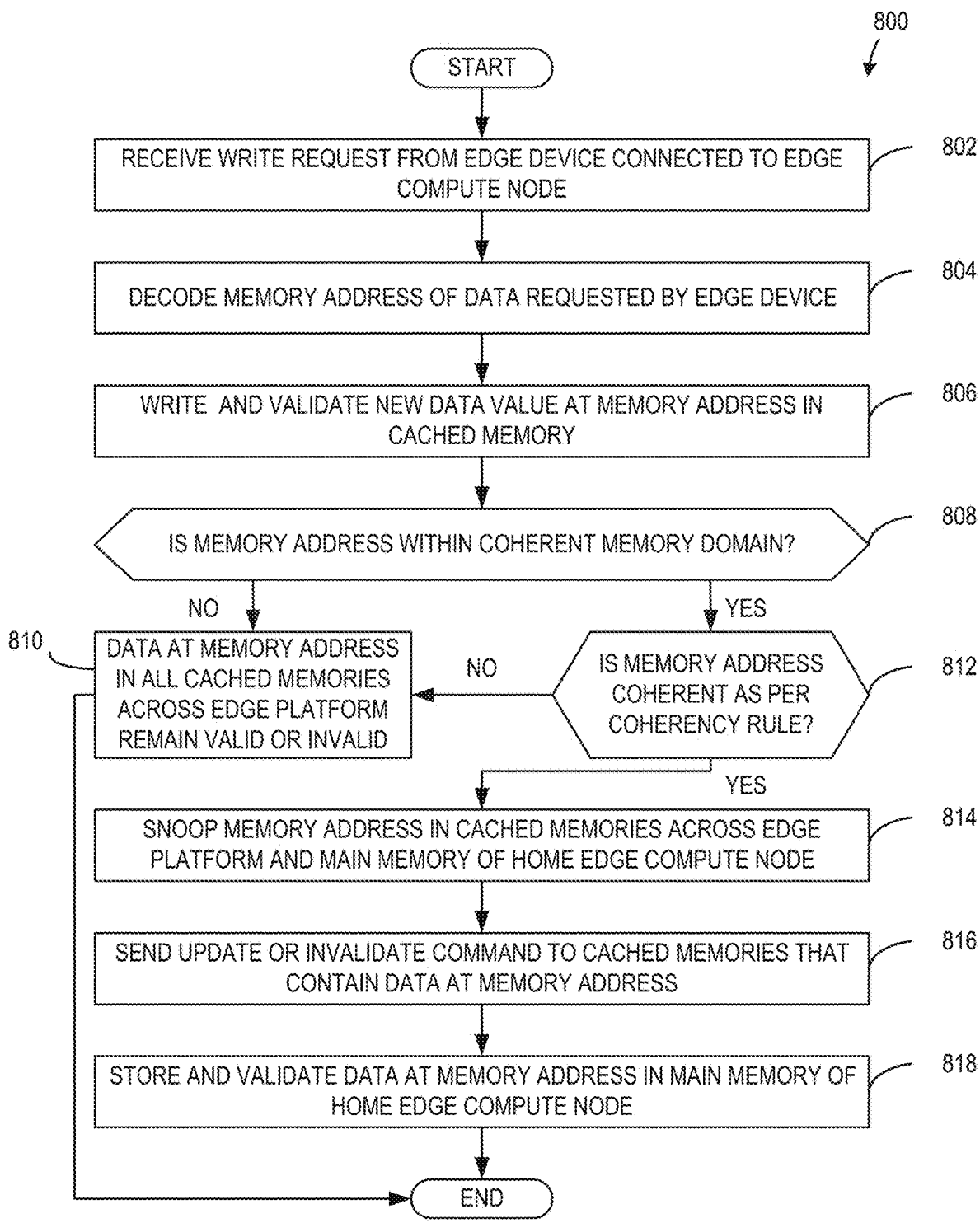
FIG. 8 is a flowchart representative of example machine readable instructions that may be executed by example processor circuitry to implement write requests to an example CXL endpoint in a distributed coherent Edge computing system.

FIG. 8 is a flowchart representative of example machine readable instructions and/or example operations 800 that may be executed and/or instantiated by processor circuitry to implement the CXL endpoint 530 to perform a write request from an Edge device 522 connected to an Edge compute node 500 across a distributed coherent Edge computing network 400. The machine readable instructions and/or operations 700 of FIG. 7 begin at block 702, at which the I/O circuitry 534 receives a write request input from the Edge device 522.

At block 804, the system address generator circuitry 538 performs calculations to decode the memory address associated with the data write request sent from the Edge device 522. The memory address being a reference to the memory location of the data to be updated by the coherency controller circuitry 536.

At block 806, in response to the memory address being input to the coherency controller circuitry 536, it will locate the data stored at the local memory location as referenced by the memory address, write the new data value sent from the Edge device 522 at the local memory location, and validate the data. The local memory location being either the cache memory 548 or the main memory 546 of the CXL endpoint 530 or the memory 506 of the Edge compute node 500. The coherency controller circuitry 536 would search the cache memory 548 for the memory address first as that would be the fastest means for data detection and retrieval.

At block 808, the coherency controller circuitry 536 determines if the memory address is within the coherent memory domain(s). The coherency controller circuitry 536 can use the configurations implemented by the coherent domain configuration circuitry 542 to check if the memory address of the written data is in the coherent memory domain(s).

At block 810, if the coherency controller circuitry 536 determines that the memory address is not within the coherent memory domain(s), then the valid/invalid state of the data at the memory address in all the cached memories and main memories in the other CXL endpoints across the Edge platform remains the same.

At block 812, if the coherency controller circuitry 536 determines that the memory address is within the coherent memory domain(s), then it will determine if the memory address needs to remain coherent as per the coherency rule(s) configured by the coherency rule(s) configuration circuitry 544. If the coherency rule(s) classifies the memory address as not needing to be coherent at the given moment, then the valid/invalid state of the data at the memory address in all the cached memories and main memories in the other CXL endpoints across the Edge platform remains the same.

At block 814, if the coherency controller circuitry 536 determines that the memory address does require coherence as per the coherency rule(s), then the coherency controller circuitry 536 snoops the CXL interconnect for the memory address in the cache memories of the other CXL endpoints. The snoop will send out a signal to the other CXL endpoints to determine the memory locations referenced by the memory address in their cached memories.

At block 816, in response to the other CXL endpoints determining the memory locations from the snoop, the coherency controller circuitry 536 sends an invalidate command to the cached memories of the other CXL endpoints that contain the memory address. This will cause the data at the memory address stored in cached memories across the distributed coherent Edge computing system to become invalid, leaving the data stored in the cache memory 548 to be the only valid copy.

At block 818, the load-store circuitry 540 stores and validates the data at the memory address in the main memory 506 of the home Edge compute node. The example machine readable instructions and/or example operations 800 repeat every time the Edge device sends a write request to the CXL endpoint.

Figure 9:
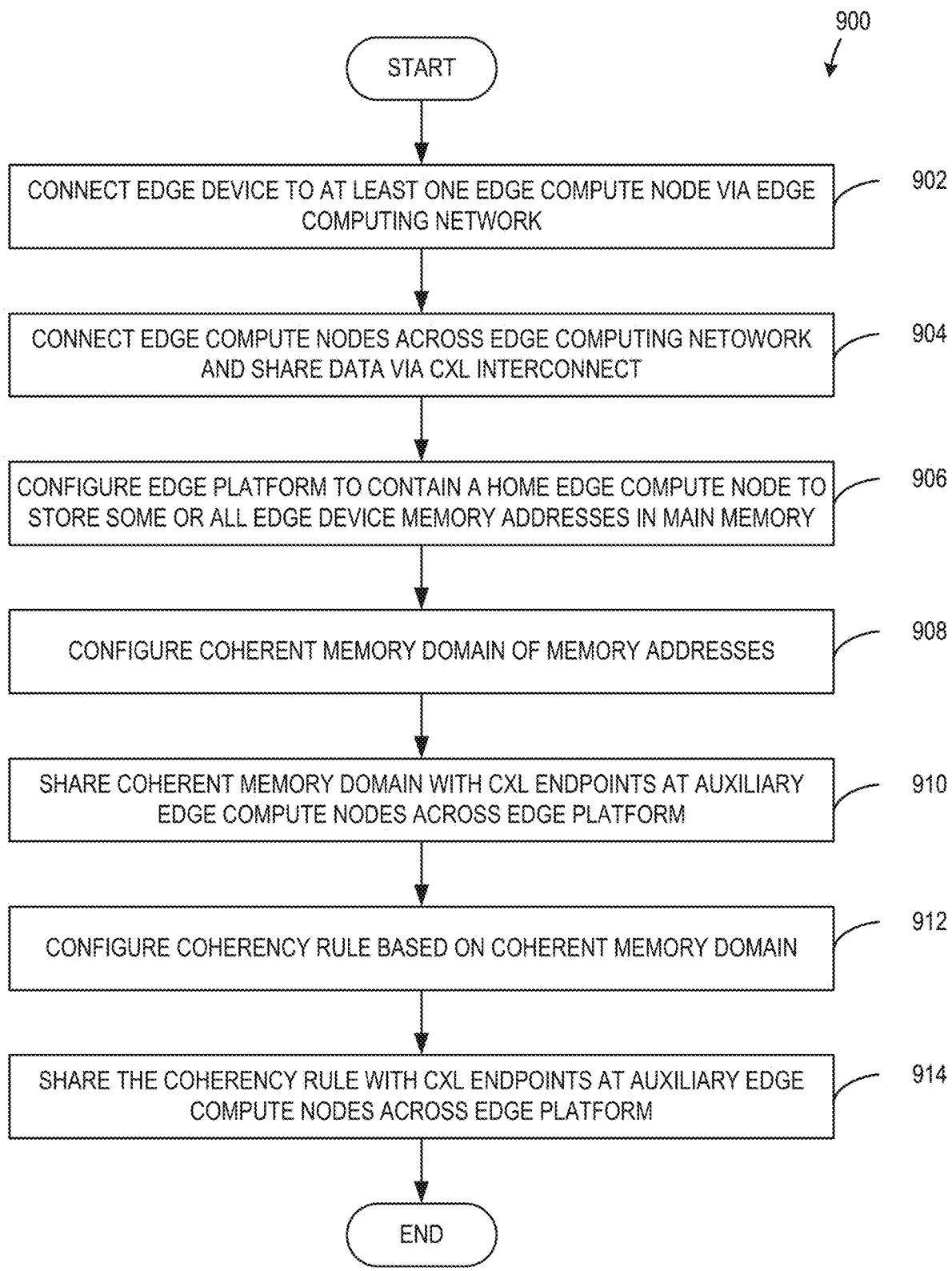
FIG. 9 is a flowchart representative of example machine readable instructions that may be executed by example processor circuitry to implement configuration of an Edge compute node in a distributed coherent Edge computing system.

FIG. 9 is a flowchart representative of example machine readable instructions and/or example operations 900 that may be executed and/or instantiated by processor circuitry to implement the CXL endpoint 530 to configure one of the Edge platforms illustrated in the distributed coherent Edge computing system 400 of FIG. 4. The machine readable instructions and/or operations 900 of FIG. 9 begin at block 902, at which the I/O circuitry 534 uses a link-up operation in the CXL.io protocol to connect an Edge device 522 to at least one Edge compute node 500 via an Edge computing network.

At block 904, the I/O circuitry 534 uses link-up, device discovery, and network enumeration operations in the CXL.io protocol. The I/O circuitry 534 detects one or more of an Edge compute node(s) 526 that can operate on a shared network and use the CXL.io protocol. The I/O circuitry 534 then connects all the Edge compute nodes via a CXL interconnect.

At block 906, the I/O circuitry 534 uses the CXL.io protocol to configure the Edge platform comprising of one Edge compute nodes as the home Edge compute node and the other Edge compute nodes as the auxiliary Edge compute nodes. The I/O circuitry 534 determines the home Edge compute node using the CXL.io protocol. The I/O circuitry 534 initializes the data of the Edge device 522 into the memory 506 of the home Edge compute node and the memory 546 of the CXL endpoint 530. The I/O circuitry 534 accesses the registers and cache memories of the auxiliary Edge compute nodes.

At block 908, the coherent domain configuration circuitry 542 uses the coherency protocol(s) to configure the coherent memory domain(s) of the memory address initialized into the memory 546 of the CXL endpoint. The coherent memory domain(s) can be configured using the coherency protocol (s).

At block 910, the coherency controller circuitry 536 shares the memory address of the coherent memory domain (s) with the CXL endpoints at the auxiliary Edge compute nodes across the Edge platform. The CXL endpoints then store the coherent memory domain(s) in cache memory.

At block 912, the coherency rule(s) configuration circuitry 544 uses the coherency protocol(s) to configure the coherency rule(s) for the coherent memory domain(s) stored in the cache memory of the CXL endpoint in the home Edge compute node. The coherency rule(s) can be configured using the coherency protocol(s).

At block 914, the coherency controller circuitry 536 shares the coherency rule(s) for the coherent memory domain(s) with the CXL endpoints at the auxiliary Edge compute nodes across the Edge platform. The CXL endpoints then store the coherency rule(s) in cache memory. The example machine readable instructions and/or example operations 900 repeat every time a new Edge device connects to the CXL endpoint.

FIG. 10 is a block diagram of an example processor platform 1000 structured to execute and/or instantiate some or all of the machine readable instructions and/or operations of FIGS. 7-9 to implement the CXL endpoint 530 of FIG. 5. The processor platform 1000 can be, for example, a server, a personal computer, a workstation, a self-learning machine (e.g., a neural network), or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs micropro- cessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the I/O circuitry 534, the coherency controller circuitry 536, the system address generator circuitry 538, the load-store circuitry 540, the coherent domain configuration circuitry 542, and the coherency rule(s) configuration circuitry 544.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIGS. 7-9, may be stored in the mass storage device 1028, in the volatile memory 1014, in the non-volatile memory 1016, and/or on a removable non-transitory computer readable storage medium such as a CD or DVD.

Figure 11:
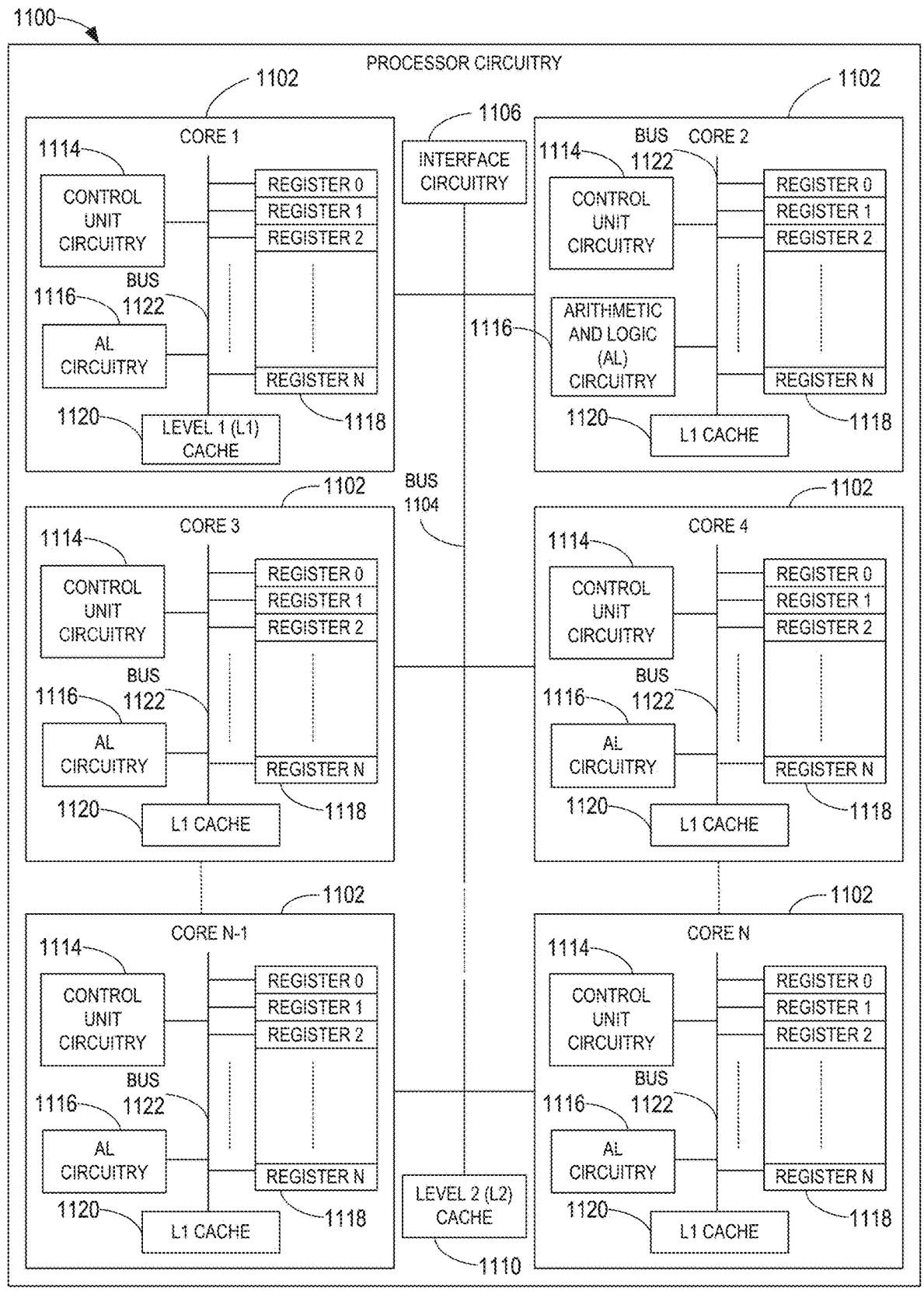
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 7-9.

The cores 1102 may communicate by an example bus 1104. In some examples, the bus_4 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The bus 1120 may implement at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general puspose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
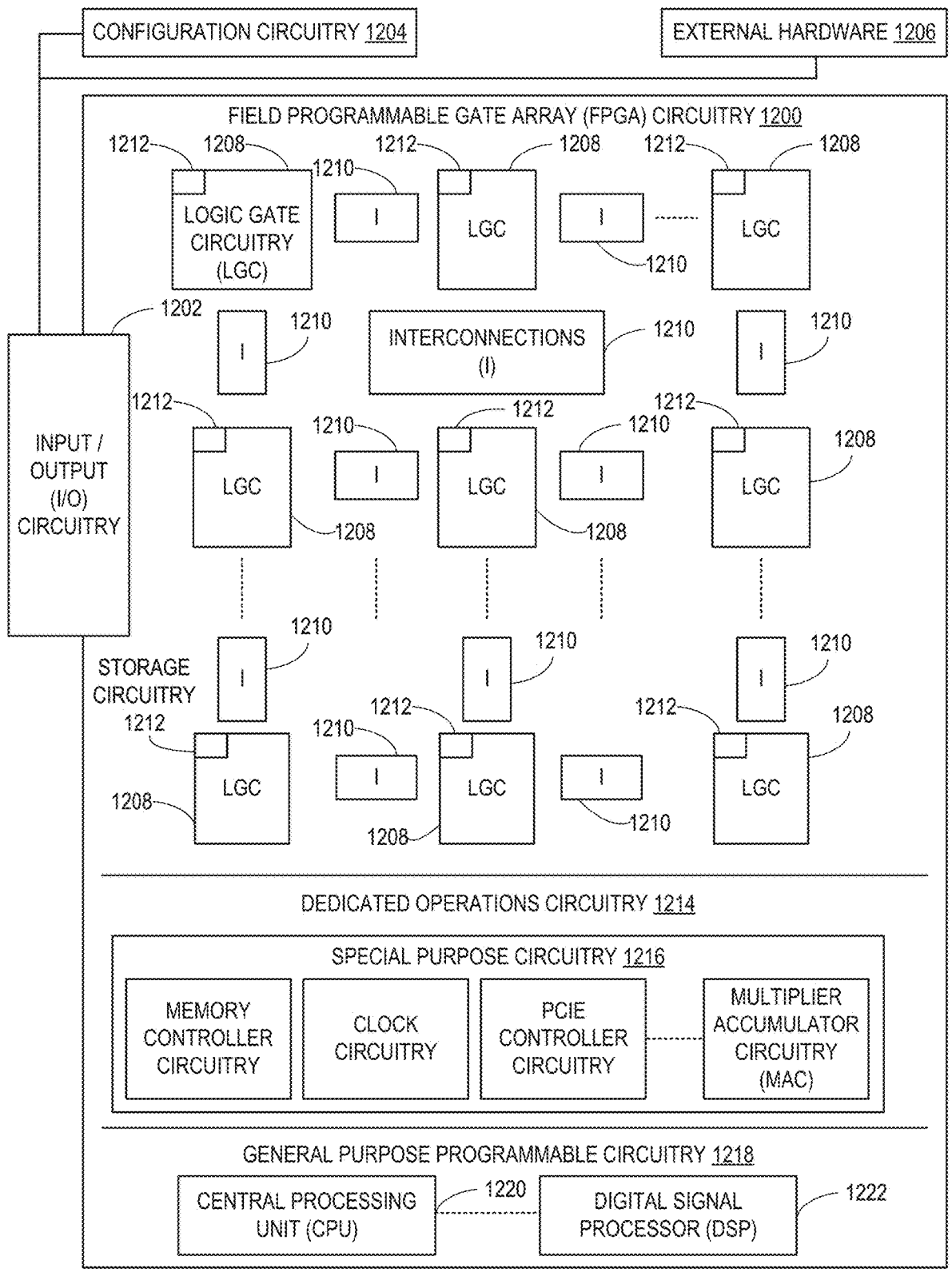
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 7-9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowchart of FIGS. 7-9. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 7-9. As such, the FPGA circuitry 1200 may be structured to effectively instantiate some or all of the machine readable instructions of the flowcharts of FIGS. 7-9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 7-9 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 7-9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 7-9 may be executed by one or more of the cores 1102 of FIG. 11 and a second portion of the machine readable instructions represented by the flowcharts of FIG. 7-9 may be executed by the FPGA circuitry 1200 of FIG. 12.

In some examples, the processor circuitry 1012 of FIG. 10 may be in one or more packages. For example, the processor circuitry 1100 of FIG. 11 and/or the FPGA circuitry_00 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
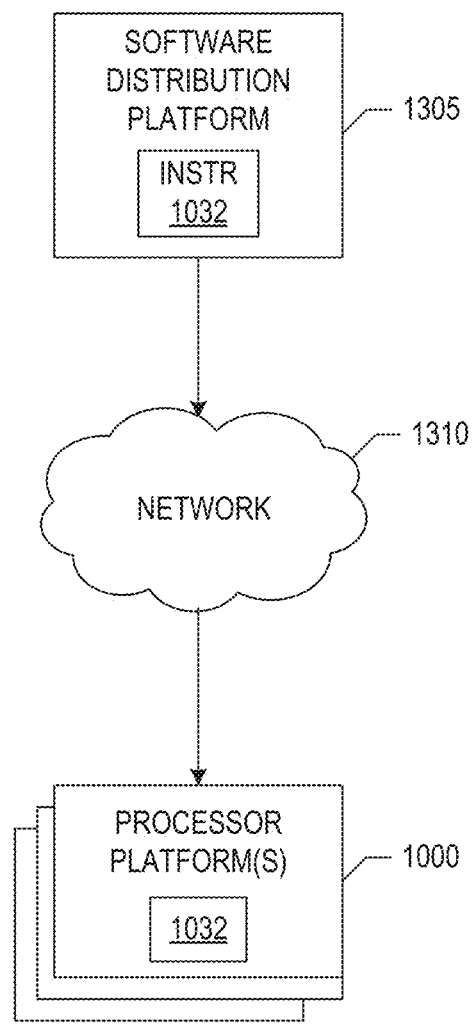
FIG. 13 is a block diagram of an example software distribution platform (e.g., one or more servers) to distribute software (e.g., software corresponding to the example machine readable instructions of FIGS. 7, 8, and 9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions 700, 800, and 900 of FIGS. 7-9, as described above. The one or more servers of the example software distribution platform 1305 are in communication with a network 1310, which may correspond to any one or more of the Internet and/or any of the example networks 1310 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 700, 800, and 900 of FIGS. 7-9, may be downloaded to the example processor platform 1000, which is to execute the machine readable instructions 1032 to implement the CXL endpoint 530. In some example, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that reduce latency and bandwidth consumption of an Edge computing network. The disclosed systems, methods, apparatus, and articles of manufacture improve the efficiency of using a computing device by establishing a distributed coherent Edge computing system with a CXL endpoint that uses CXL.io protocols, configures a coherent memory domain(s) of the memory addresses initialized from an Edge device connected to the system, and configures a coherency rule(s) for the coherent memory domain(s). The CXL endpoint then selectively snoops other cache memories across the system based on the coherent memory domain(s) and the coherency rule(s) using the coherency protocol(s). The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to share memory across a distributed coherent edge computing system are disclosed herein. Further examples and combinations thereof include the following:

Example 1 includes an apparatus for sharing of memory across a distributed coherent edge computing system, the apparatus comprising at least one memory, instructions in the apparatus, and processor circuitry to execute the instructions to configure a compute express link (CXL) endpoint to share data between memories across an Edge platform via a CXL interconnect, configure a coherent memory domain, the coherent memory domain being a subset of memory addresses associated with Edge device data that are to remain coherent across the Edge platform, configure a coherency rule of the coherent memory domain, the coherency rule being a definition of coherency assigned to the coherent memory domain, and snoop the CXL interconnect for data at memory addresses within the coherent memory domain that can be shared based on the coherency rule.

Example 2 includes the apparatus of example 1, wherein the processor circuitry is to configure network interface controller (NIC) hardware to operate as the CXL endpoint.

Example 3 includes the apparatus of example 1, wherein the processor circuitry is to configure the CXL endpoint to connect the Edge platform via a CXL interconnect in response to an Edge device connecting to a CXL-enabled edge compute node.

Example 4 includes the apparatus of example 3, wherein the processor circuitry is to configure a home Edge compute node to store Edge device data, memory addresses of Edge device data, and Edge compute node identifiers in a main memory.

Example 5 includes the apparatus of example 1, wherein the processor circuitry is to configure the coherent memory domain using a coherency protocol.

Example 6 includes the apparatus of example 1, wherein the processor circuitry is to configure the coherency rule using a coherency protocol.

Example 7 includes the apparatus of example 1, wherein the processor circuitry is to implement the CXL endpoint to snoop the CXL interconnect in response to a read request from an Edge device.

Example 8 includes the apparatus of example 1, wherein the processor circuitry is to implement the CXL endpoint to snoop the CXL interconnect in response to a write request from an Edge device.

Example 9 includes At least one non-transitory computer-readable medium comprising instructions that, when executed, allow the processor circuitry to at least configure a compute express link (CXL) endpoint to share data between memories across an Edge platform via a CXL interconnect, configure a coherent memory domain, the coherent memory domain being a subset of memory addresses associated with Edge device data that are to remain coherent across the Edge platform, configure a coherency rule of the coherent memory domain, the coherency rule being a definition of coherency assigned to the coherent memory domain, and snoop the CXL interconnect for data at memory addresses within the coherent memory domain that can be shared based on the coherency rule.

Example 10 includes the at least one non-transitory computer-readable medium of example 9, wherein the instructions are to configure network interface controller (NIC) hardware to operate as the CXL endpoint.

Example 11 includes the at least one non-transitory computer-readable medium of example 9, wherein the instructions are to configure the CXL endpoint to connect the Edge platform via a CXL interconnect in response to an Edge device connecting to a CXL-enabled edge compute node.

Example 12 includes the at least one non-transitory computer-readable medium of example 11, wherein the instructions are to configure a home Edge compute node to store Edge device data, memory addresses of Edge device data, and Edge compute node identifiers in a main memory.

Example 13 includes the at least one non-transitory computer-readable medium of example 9, wherein the instructions are to configure the coherent memory domain using a coherency protocol.

Example 14 includes the at least one non-transitory computer-readable medium of example 9, wherein the instructions are to configure the coherency rule using a coherency protocol.

Example 15 includes the at least one non-transitory computer-readable medium of example 9, wherein the instructions are to implement the CXL endpoint to snoop the CXL interconnect in response to a read request from an Edge device.

Example 16 includes the at least one non-transitory computer-readable medium of example 9, wherein the instructions are to implement the CXL endpoint to snoop the CXL interconnect in response to a write request from an Edge device.

Example 17 includes an apparatus for sharing of memory across a distributed coherent edge computing system, the apparatus comprising means for configuring a compute express link (CXL) endpoint to share data between memories across an Edge platform via a CXL interconnect, wherein the means for configuring is to determine a coherent memory domain, wherein the means for configuring is to determine a coherency rule of the coherent memory domain, and means for snooping data at memory addresses within the coherent memory domain to be consistent based on the coherency rule.

Example 18 includes the apparatus of example 17, wherein the means for configuring is to configure network interface controller (NIC) hardware to operate as the CXL endpoint.

Example 19 includes the apparatus of example 17, wherein the means for configuring is to connect the Edge platform to an Edge compute node via a CXL interconnect.

Example 20 includes the apparatus of example 19, wherein the means for configuring is to configure the home Edge compute node to store Edge device data, memory addresses of Edge device data, and Edge compute node identifiers in a main memory.

Example 21 includes the apparatus of example 17, wherein the means for configuring is to determine the coherent memory domain using a coherency protocol.

Example 22 includes the apparatus of example 17, wherein the means for configuring is to determine the coherency rule using a coherency protocol.

Example 23 includes the apparatus of example 17, wherein the means for snooping is to snoop the CXL interconnect in response to a read request from an Edge device.

Example 24 includes the apparatus of example 17, wherein the means for snooping is to snoop the CXL interconnect in response to a write request from an Edge device.

Example 25 includes a method for sharing of memory across a distributed coherent edge computing system, the method comprising configuring a compute express link (CXL) endpoint to share data between memories across an Edge platform via a CXL interconnect, configuring a coherent memory domain, the coherent memory domain(s) being a subset of memory addresses associated with Edge device data that are to remain coherent across the Edge platform, configuring a coherency rule of the coherent memory domain, the coherency rule being a definition of coherency assigned to the coherent memory domain, and snooping the CXL interconnect for data at memory addresses within the coherent memory domain that can be shared based on the coherency rule.

Example 26 includes the method of example 25, including configuring network interface controller (NIC) hardware to operate as the CXL endpoint.

Example 27 includes the method of example 25, including configuring the CXL endpoint to connect the Edge platform via a CXL interconnect in response to an Edge device connecting to a CXL-enabled edge compute node.

Example 28 includes the method of example 27, including configuring a home Edge compute node to store Edge device data, memory addresses of Edge device data, and Edge compute node identifiers in a main memory.

Example 29 includes the method of example 25, including configuring the coherent memory domain using a coherency protocol.

Example 30 includes the method of example 25, including configuring the coherency rule using a coherency protocol.

Example 31 includes the method of example 25, including implementing the CXL endpoint to snoop the CXL interconnect in response to a read request from an Edge device.

Example 32 includes the method of example 25, including implementing the CXL endpoint to snoop the CXL interconnect in response to a write request from an Edge device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
at least one memory;
instructions in the apparatus; and
at least one processor circuit to execute the instructions to:
configure a compute express link (CXL) endpoint to facilitate communication, via a CXL interconnect, between a first Edge compute node including a first memory and a second Edge compute node including a second memory, the first Edge compute node and the second Edge compute node to form an Edge platform;
configure a coherent memory domain between the first memory and the second memory, the coherent memory domain including first memory addresses associated with first data from an Edge device that is to remain coherent across the Edge platform;
configure a coherency rule of the coherent memory domain, the coherency rule to define a level of coherency for the coherent memory domain;
configure at least one of the first Edge compute node or the second Edge compute node to be a home Edge compute node, main memory of the home Edge compute node to store the first data, the first memory addresses associated with the first data, and identifiers of the first Edge compute node and the second Edge compute node; and
snoop the CXL interconnect for second data at second memory addresses within the coherent memory domain, the second data permitted to be shared based on the coherency rule.

2. The apparatus of claim 1, wherein one or more of the at least one processor circuit is to configure network interface controller (NIC) hardware to operate as the CXL endpoint.

3. The apparatus of claim 1, wherein one or more of the at least one processor circuit is to configure the CXL endpoint to connect the Edge platform via the CXL interconnect in response to the Edge device connecting to a CXL-enabled edge compute node.

4. The apparatus of claim 1, wherein one or more of the at least one processor circuit is to configure the coherent memory domain using a coherency protocol.

5. The apparatus of claim 1, wherein one or more of the at least one processor circuit is to configure the coherency rule using a coherency protocol.

6. The apparatus of claim 1, wherein one or more of the at least one processor circuit is to implement the CXL endpoint to snoop the CXL interconnect in response to a read request from the Edge device.

7. The apparatus of claim 1, wherein one or more of the at least one processor circuit is to implement the CXL endpoint to snoop the CXL interconnect in response to a write request from the Edge device.

8. At least one non-transitory computer-readable medium comprising instructions to cause at least one processor circuit to at least: configure a compute express link (CXL) endpoint to facilitate communication, via a CXL interconnect, between a first Edge compute node including a first memory and a second Edge compute node including a second memory, the first Edge compute node and the second Edge compute node to form an Edge platform;
configure a coherent memory domain between the first memory and the second memory, the coherent memory domain including first memory addresses associated with first data from an Edge device that is to remain coherent across the Edge platform;
configure a coherency rule of the coherent memory domain, the coherency rule to define a level of coherency for the coherent memory domain;
configure at least one of the first Edge compute node or the second Edge compute node to be a home Edge compute node, main memory of the home Edge compute node to store the first data, the first memory addresses of associated with the first data, and identifiers of the first Edge compute node and the second Edge compute node; and snoop the CXL interconnect for second data at second memory addresses within the coherent memory domain, the second data permitted to be shared based on the coherency rule.

9. The at least one non-transitory computer-readable medium of claim 8, wherein the instructions cause one or more of the at least one processor circuit to configure network interface controller (NIC) hardware to operate as the CXL endpoint.

10. The at least one non-transitory computer-readable medium of claim 8, wherein the instructions cause one or more of the at least one processor circuit to configure the CXL endpoint to connect the Edge platform via the CXL interconnect in response to the Edge device connecting to a CXL-enabled edge compute node.

11. The at least one non-transitory computer-readable medium of claim 8, wherein the instructions cause one or more of the at least one processor circuit to configure the coherent memory domain using a coherency protocol.

12. The at least one non-transitory computer-readable medium of claim 8, wherein the instructions cause one or more of the at least one processor circuit to configure the coherency rule using a coherency protocol.

13. The at least one non-transitory computer-readable medium of claim 8, wherein the instructions cause one or more of the at least one processor circuit to implement the CXL endpoint to snoop the CXL interconnect in response to a read request from the Edge device.

14. The at least one non-transitory computer-readable medium of claim 8, wherein the instructions cause one or more of the at least one processor circuit to implement the CXL endpoint to snoop the CXL interconnect in response to a write request from the Edge device.

15. An apparatus comprising:
means for configuring a compute express link (CXL) endpoint to facilitate communication, via a CXL interconnect, between a first Edge compute node including a first memory and a second Edge compute node including a second memory, the first Edge compute node and the second Edge compute node to form an Edge platform, the means for configuring to:
configure a coherent memory domain between the first memory and the second memory, the coherent memory domain including first memory addresses associated with first data from an Edge device that is to remain coherent across the Edge platform;
configure a coherency rule to define a level of coherency for the coherent memory domain;
configure at least one of the first Edge compute node or the second Edge compute node to be a home Edge compute node, main memory of the home Edge compute node to store the first data, the first memory addresses associated with the first data, and identifiers of the first Edge compute node and the second Edge compute node; and
means for snooping second data at second memory addresses within the coherent memory domain, the second data to be consistent based on the coherency rule.

16. The apparatus of claim 15, wherein the means for configuring is to configure network interface controller (NIC) hardware to operate as the CXL endpoint.

17. The apparatus of claim 15, wherein the means for configuring is to configure the CXL endpoint to connect the Edge platform via the CXL interconnect.

18. The apparatus of claim 15, wherein the means for configuring is to determine the coherent memory domain using a coherency protocol.

19. The apparatus of claim 15, wherein the means for configuring is to determine the coherency rule using a coherency protocol.

20. The apparatus of claim 15, wherein the means for snooping is to snoop the CXL interconnect in response to a read request from the Edge device.

21. The apparatus of claim 15, wherein the means for snooping is to snoop the CXL interconnect in response to a write request from the Edge device.

22. A method comprising:
configuring a compute express link (CXL) endpoint to facilitate communication, via a CXL interconnect, between a first Edge compute node including a first memory and a second Edge compute node including a second memory, the first Edge compute node and the second Edge compute node to form an Edge platform;
configuring a coherent memory domain between the first memory and the second memory, the coherent memory domain including first memory addresses associated with first data from an Edge device that is to remain coherent across the Edge platform;
configuring a coherency rule of the coherent memory domain, the coherency rule to define a level of coherency for the coherent memory domain;
configuring at least one of the first Edge compute node or the second Edge compute node to be a home Edge compute node, main memory of the home Edge compute node to store the first data, the first memory addresses associated with the first data, and identifiers of the first Edge compute node and the second Edge compute node; and
snooping the CXL interconnect for second data at second memory addresses within the coherent memory domain, the second data permitted to be shared based on the coherency rule.

23. The method of claim 22, including configuring network interface controller (NIC) hardware to operate as the CXL endpoint.

24. The method of claim 22, including configuring the CXL endpoint to connect the Edge platform via the CXL interconnect in response to the Edge device connecting to a CXL-enabled edge compute node.

25. The method of claim 22, including configuring the coherent memory domain using a coherency protocol.

26. The method of claim 22, including configuring the coherency rule using a coherency protocol.

27. The method of claim 22, including implementing the CXL endpoint to snoop the CXL interconnect in response to a read request from the Edge device.

28. The method of claim 22, including implementing the CXL endpoint to snoop the CXL interconnect in response to a write request from the Edge device.

\* \* \* \* \*